US010230369B2

(12) United States Patent
Plusquellic et al.

(10) Patent No.: US 10,230,369 B2
(45) Date of Patent: Mar. 12, 2019

(54) SYSTEMS AND METHODS FOR LEVERAGING PATH DELAY VARIATIONS IN A CIRCUIT AND GENERATING ERROR-TOLERANT BITSTRINGS

(71) Applicant: STC.UNM, Albuquerque, NM (US)

(72) Inventors: James Plusquellic, Albuquerque, NM (US); James Aarestad, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 83 days.

(21) Appl. No.: 14/913,454

(22) PCT Filed: Aug. 28, 2014

(86) PCT No.: PCT/US2014/053276
§ 371 (c)(1),
(2) Date: Feb. 22, 2016

(87) PCT Pub. No.: WO2015/031683
PCT Pub. Date: Mar. 5, 2015

(65) Prior Publication Data
US 2016/0204781 A1 Jul. 14, 2016

Related U.S. Application Data

(60) Provisional application No. 61/870,950, filed on Aug. 28, 2013, provisional application No. 61/870,969, filed on Aug. 28, 2013.

(51) Int. Cl.
*H05B 33/08* (2006.01)
*H03K 19/003* (2006.01)
(Continued)

(52) U.S. Cl.
CPC ........ *H03K 19/00323* (2013.01); *H03K 3/84* (2013.01); *H03K 19/00315* (2013.01); *H03K 19/215* (2013.01); *H03K 23/004* (2013.01)

(58) Field of Classification Search
CPC .......... G06F 7/58; G06F 7/588; H05K 999/99
See application file for complete search history.

(56) References Cited

U.S. PATENT DOCUMENTS 6,028,527 A * 2/2000 Soenen ............... H04L 9/12
340/12.23
6,904,150 B1 * 6/2005 Dent ................ H04L 9/304
380/28
(Continued)

FOREIGN PATENT DOCUMENTS

WO 2011086688 A1 7/2011

OTHER PUBLICATIONS

Lamesh, et. al, "REBEL and TDC: Two Embedded Test Structure for On-chip Measurements of Within-Die Path Delay Variation", 2011 IEEE/ACM International Conference on Computer-Aided Design (ICCAD), pp. 170-177.*
(Continued)

*Primary Examiner* — Seokjin Kim
(74) *Attorney, Agent, or Firm* — Valauskas Corder LLC

(57) ABSTRACT

A Hardware-Embedded Delay PUF (HELP) leverages entropy by monitoring path stability and measuring path delays from core logic macros. HELP incorporates techniques to deal with bias. A unique feature of HELP is that it may compare data measured from different test structures. HELP may be implemented in existing FPGA platforms. HELP may leverage both path stability and within-die variations as sources of entropy.

20 Claims, 34 Drawing Sheets

(51) Int. Cl.
*H03K 19/21* (2006.01)
*H03K 3/84* (2006.01)
*H03K 23/00* (2006.01)

(56) References Cited

U.S. PATENT DOCUMENTS

| | | | | |
|---|---|---|---|---|
| 7,904,731 | B2* | 3/2011 | Devadas | G06F 21/31 |
| | | | | 257/E23.179 |
| 8,610,454 | B2* | 12/2013 | Plusquellic | H04L 9/0861 |
| | | | | 326/8 |
| 9,449,153 | B2* | 9/2016 | Guo | G06F 21/10 |
| 2011/0055649 | A1 | 3/2011 | Koushanfar et al. | |
| 2011/0066670 | A1* | 3/2011 | Yu | G06F 7/582 |
| | | | | 708/252 |
| 2011/0215829 | A1* | 9/2011 | Guajardo Merchan | |
| | | | | G06F 7/588 |
| | | | | 326/8 |
| 2012/0072737 | A1 | 3/2012 | Schrijen et al. | |
| 2013/0147511 | A1* | 6/2013 | Koeberl | H03K 19/23 |
| | | | | 326/8 |
| 2014/0103344 | A1* | 4/2014 | Tehranipoor | G01R 31/2884 |
| | | | | 257/48 |
| 2014/0108786 | A1* | 4/2014 | Kreft | G06F 21/71 |
| | | | | 713/156 |
| 2014/0208178 | A1* | 7/2014 | Sunter | G01R 31/3177 |
| | | | | 714/731 |
| 2015/0026532 | A1* | 1/2015 | Clouqueur | G01R 31/31854 |
| | | | | 714/726 |

OTHER PUBLICATIONS

Majzoobi, et. al, "FPGA PUF using programmable delay lines", WIFS'2010, Dec. 12-15, 2010.*

J. Aarestad et al., HELP: A Hardware-Embedded Delay PUF., IEEE Design & Test, May 29, 2013, vol. 30, Issue 2, pp. 17-25, See p. 17, left column, line 14—p. 19, right column, line 11, p. 21, right column, line 3—p. 22, left column, line 22; and figure 1.

* cited by examiner

FIG. 18A  FIG. 18B

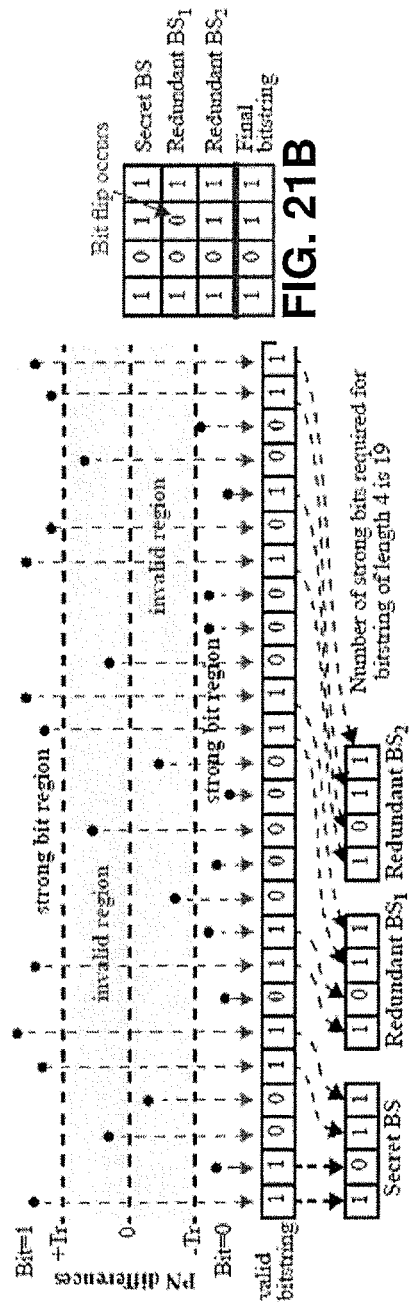

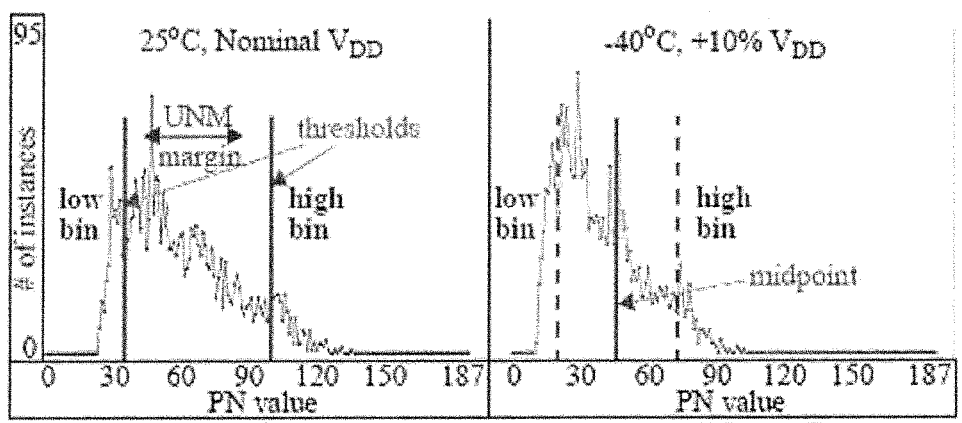
FIG. 22A  FIG. 22B

SYSTEMS AND METHODS FOR LEVERAGING PATH DELAY VARIATIONS IN A CIRCUIT AND GENERATING ERROR-TOLERANT BITSTRINGS

This application claims the benefit of U.S. Provisional Application No. 61/870,969, filed on Aug. 28, 2013, and U.S. Provisional Application No. 61/870,750, filed on Aug. 28, 2013, each of which are incorporated by reference in their respective entirety.

TECHNICAL FIELD

This disclosure relates to systems and methods for generating random bitstrings and more particularly, to Physically Unclonable Functions (PUFs).

BACKGROUND

Random bitstrings may form the basis for encryption, identification, authentication, and feature activation in hardware security. In current technologies, keying material for encryption may be stored as digital bitstrings in non-volatile memory on FPGAs (Field-Programmable Gate Array) and ASICs (Application Specific Integrated Circuit). However, secrets stored this way may not be secure against a determined adversary, who can use probing attacks to steal the secret. Physical Unclonable Functions (PUFs) may be used as alternative to storing digital bitstrings in non-volatile memory. PUFs may leverage random manufacturing variations in integrated circuits as the source of entropy for generating random bitstrings, and may incorporate an on-chip infrastructure for measuring and digitizing the corresponding variations. PUFs may measure and digitize the natural variations that occur in path delays, leakage current, or SRAM power-up patterns, to produce a random bit string.

The quality of a PUF may be judged based on one or more of uniqueness among a population, randomness of the bitstrings produced, and reproducibility or stability across varying environmental conditions (i.e., temperature and voltage). The quality of current PUFs may be less than ideal. Further, current techniques for determining the uniqueness, the randomness, and the stability of PUFs may be less than ideal.

SUMMARY

This disclosure relates to systems and methods for generating random bitstrings and more particularly, to Physically Unclonable Functions (PUFs).

According to one example of this disclosure, a Hardware-Embedded Delay PUF (HELP) that leverages entropy by monitoring path stability and measuring path delays from core logic macros, i.e., digital functional units designed to carry out a specific task on the chip, is described. The paths in the macros can vary significantly by design and therefore, HELP incorporates techniques to deal with this type of 'bias.' All other PUFs compare data measured from identically designed test structures. A unique feature of HELP is that it may compare data measured from different test structures. HELP may be implemented as a "soft PUF." That is, it may be implemented in existing (legacy) FPGA platforms without making any changes to the FPGA design. HELP may leverage both path stability and within-die variations as sources of entropy. All other PUF leverage sources of entropy that must be related to within-die variations of identically designed test structures.

According to one example of this disclosure, a REBEL structure and a Time-to-Digital-Converter (TDC) on-chip test measurement structure to measure the path delays of core logic macros under test are described.

According to one example of this disclosure, bitstring generation methods, each of which trades-offs public (Helper) data size, bitstring generation time, and resilience to reverse engineering and model building attacks are described. One bitstring generation method includes Universal, No Modulus (UNM), which may include the simplest and smallest Helper Data overhead, but may be least secure. One bitstring generation method includes Universal, No Modulus, Difference (UNMD), which may be more expensive than UNM, but may be able to produce very large, high quality bitstrings that are resilient to reverse engineering attacks. One bitstring generation method includes Dual PN Count (DPNC), which may be more expensive than UNM and UNMD and may only be able to generate small bitstrings, but may be the most secure against attacks.

According to one example of this disclosure a modulus technique for DPNC that is designed to deal with undesirable bias effects, such as, comparing a long path with a short path is described.

According to one example of this disclosure, modulo thresholding as a technique that both improves reliability and also increases entropy by filtering pairings of paths used in bitstring generation whose difference in delays are greater than the level of within-die variations is described.

According to one example of this disclosure, spatial redundancy as a technique to allow a user to increase further the level of reliability provided by modulo thresholding is described.

The details of one or more examples are set forth in the accompanying drawings and the description below. Other features, objects, and advantages will be apparent from the description and drawings, and from the claims.

BRIEF DESCRIPTION OF DRAWINGS

FIG. 21A-21B are conceptual diagrams illustrating one or more techniques of this disclosure.

FIG. 22A-22B are example graphs illustrating one or more techniques of this disclosure.

DETAILED DESCRIPTION

Figure 1:
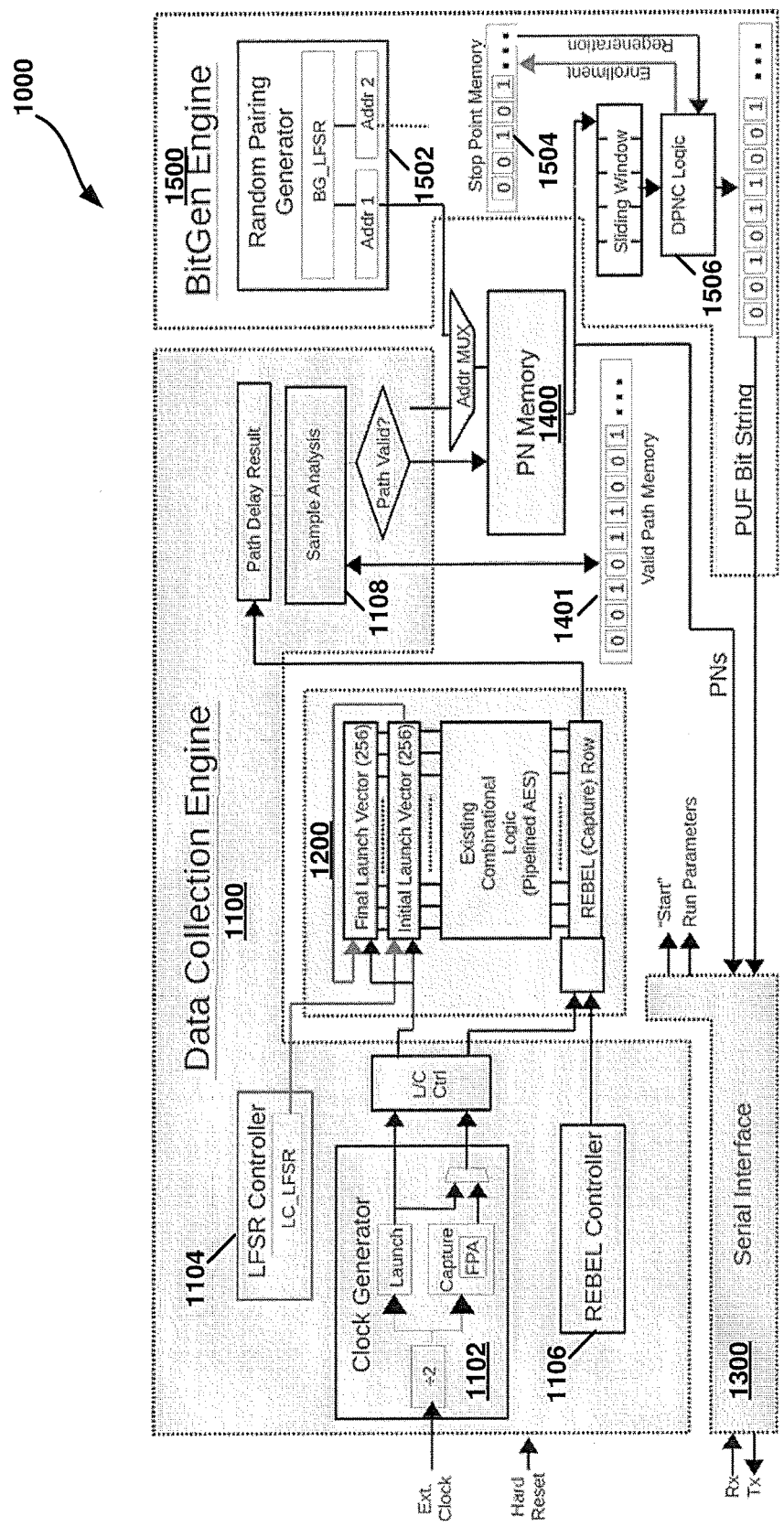
FIG. 1 is a block diagram illustrating an example of Physically Unclonable Function (PUF) that may implement one or more techniques of this disclosure.

Cryptographic and authentication applications in application-specific integrated circuits (ASICs) and FPGAs, as well as codes for the activation of on-chip features, require the use of embedded secret information. Process variations are increasing as layout geometries shrink across technology generations. For example, within-die variations in path delays are increasing with scaling. Although the electrical variations introduced by process variations, including higher levels of within-die delay variations, are undesirable from a design perspective, they represent a rich source of entropy for applications that make use of "secrets," such as authentication, hardware metering and encryption.

Physical Unclonable Functions or PUFs are a class of circuit primitives that leverage within-die variations as a means of generating random bitstrings. Although undesirable from a design perspective, the electrical variations introduced by process variations define the entropy source on which PUFs are based. PUFs are designed to reliably differentiate one chip from another by leveraging the naturally-occurring random process variations which occur when the chips are fabricated. PUFs are designed to measure and 'digitize' electrical variations to create random bitstrings. The generation of secret bitstrings using PUFs, provides several distinct advantages over conventional methods, including the elimination of costly non-volatile memory, and the potential to increase the number of random bits available to applications.

Physical unclonable functions are becoming increasingly attractive for generating random bitstrings for a wide range of security-related applications. The chip-specific identifiers produced by PUFs can serve several applications including chip ID, authentication, metering, and encryption. Each IC is uniquely characterized by random manufacturing variations, and therefore, the bitstrings produced by PUFs are unique from one chip to the next. Cloning a PUF, i.e., making an exact copy, is nearly impossible because it would require control over the fabrication process that is well beyond current capabilities. A PUF maps a set of digital "challenges" to a set of digital "responses" by exploiting the physical variations in an IC population. In some cases, the entropy in the responses is stored in the physical structures on the IC and can only be retrieved when the IC is powered up. The analog nature of the entropy source makes PUFs "tamper-evident," whereby invasive attacks by adversaries will, with high probability, change its characteristics.

The main distinguishing characteristic of PUF systems is the source of entropy that they leverage. Proposed entropy sources include variations in transistor threshold voltages, in propagation delays in inverter chains and ROs, in power up patterns in SRAMs, in leakage current, in metal resistance, and many others. PUFs measure and digitize the natural variations that occur in path delays, leakage current, SRAM power-up patterns, etc. to produce a long sequence of random bits, i.e., a bitstring. Proposed PUF designs generally fall into one of the following classifications: SRAM PUFs, ring oscillators, MOS drive-current PUFs, delay line and arbiter PUFs, and PUFs based upon variations in a chip's metal wires. Delay-based PUFs also include such designs as the Glitch PUF, which leverages variation in glitch behavior. Each of these PUFs takes advantage of one or more naturally-varying properties, and nearly all PUFs share a common set of challenges such as measurement error and uncertainty, and fluctuations in voltage or temperature. The most common sources of variations that PUFs leverage include path delay, metal resistance and SRAM power-up patterns. The degree to which a given PUF can tolerate or mitigate these challenges is an important indicator of its utility for generating secret data.

The quality of the bitstrings produced by a PUF are typically evaluated using a suite of statistical tests. Generally, three criteria are considered essential for a PUF to be used for applications such as encryption: 1) the bitstrings produced for each chip must be sufficiently unique to distinguish each chip in the population, 2) the bitstrings must be random in sequence, making them difficult for an adversary to model and predict, and 3) the bitstring for any one chip must be stable over time and across varying environmental conditions, i.e., reproducible across adverse environmental conditions.

This disclosure describes a Hardware-Embedded Delay PUF (HELP) that is designed to leverage path delay variations that occur in the core logic macros of a chip to create random bitstrings. The hardware-embedded delay PUF (HELP) that is described and investigated in this disclosure leverages path stability characteristics and within-die delay variations in core logic macros. The bitstrings produced by a set of 30 FPGA boards were evaluated with regard to several statistical quality metrics including uniqueness, randomness, and stability. The stability characteristics of the bitstrings were evaluated by subjecting the FPGAs to commercial-level temperature and supply voltage variations. In particular, the reproducibility of the bitstrings generated was evaluated at 0° C., 25° C., and 70° C., and at nominal and ±10% of the supply voltage. An error avoidance scheme is described that provides significant improvement against bit-flip errors in the bitstrings.

Further, this disclosure describes test chip results of a hardware-embedded delay PUF (HELP) that extracts entropy from the stability characteristics and within-die variations in path delays. In one example, HELP obtains accurate measurements of path delays within core logic macros using an embedded test structure called REBEL. REBEL provides capabilities similar to an off-chip logic analyzer, and allows very fast analysis of the temporal behavior of signals emerging from paths in a core logic macro. Statistical characteristics related to the randomness, reproducibility and uniqueness of the bitstrings produced by HELP are evaluated across industrial-level temperature and supply voltage variations.

The arbiter (ARB) PUF is one of the first to be described in the literature. It derives its entropy from variations that occur in the delays of identically configured logic paths. The ARB PUF uses a phase comparator to decide which path of a pair is faster under a given challenge, and generates a 0 or 1 as a response indicator bit. Unfortunately, the ARB PUF is not reliable, requiring error correction in cases where the sequence of response bits (the bitstring) needs to be reproduced. This disclosure describes a test structure, called a time-to-digital converter (TDC) that is capable of measuring the actual delays of the paths. This type of 'soft' information can be used to improve the reliability of the ARB PUF. Data obtained from a set of chips fabricated in IBM's 90 nm technology, and collected across 9 temperature-voltage corners were used to demonstrate its effectiveness. The bitstrings were evaluated using statistical tests which measure randomness, uniqueness and reliability.

FIG. 1 is a block diagram illustrating an example of Physically Unclonable Function (PUF) that may implement one or more techniques of this disclosure. The PUF illustrated in FIG. 1 is based on path delay variations and may be referred to as HELP. HELP is a practical, reliable, and realizable PUF. The disclosure provides a detailed examination of HELP and demonstrated two bit generation techniques called DPNC and UNMD for the HELP PUF. The HELP PUF is based on variations in path delays and on the stability of those paths, each measured from a core logic macro embedded within the chip. The results of the HD, NIST, and POF analyses, described below show the bitstrings to be genuinely random, unique, and highly reproducible under changing environmental conditions, all of which are critical requirements for the potential use of HELP in applications such as mobile computing or smart-cards.

Features that differentiate HELP from other delay-based PUFs include, for example: 1) the capability of comparing paths of different lengths without adding bias, 2) elimination of specialized test structures, 3) a minimally invasive design with low per-bit area and performance impact, and 4) a PUF engine that is integrated into the existing functional units of the chips and requires no external testing resources. The integration of HELP into an existing functional unit, such as the Advanced Encryption Standard (AES), allows it to leverage a large source of entropy while minimizing its overall footprint. This large source of entropy allows HELP to generate long bitstrings, while being conservative in the paths selected for bit generation. The large availability of paths also enables unique opportunities for avoiding bit-flip errors.

Further, this disclosure also described a novel modulus-based technique that permits the direct comparison of delay measurements from logic paths of widely varying lengths; a path delay measurement binning scheme that improves tolerance to environmental, measurement and meta-stability noise sources; and fault-tolerant bit generation techniques that provide resilience against bit-flip errors caused by these noise sources. These techniques may be used with HELP.

In one example, the characteristics of the HELP PUF were demonstrated on a set of 30 Virtex-II Pro FPGA boards. In one example, HELP is integrated into an AES functional unit and is evaluated across a set of 9 temperature-voltage (TV) corners which represent commercial-grade standards. The bitstrings produced by each board were evaluated using statistical tests, which are designed to measure their uniqueness, reliability, and randomness.

In one example, HELP is implemented in a floating point unit and multiple copies are fabricated in a 90 nm test chip. Three bitstring generation methods called UNM, UNMD and DPNC are investigated for the floating point unit implementation. While the statistical characteristics of UNM were substandard, excellent results were obtained from UNMD and DPNC. The poor results from UNM demonstrate that it may not be possible in some macros to base the entropy source entirely on path stability. Although aging was not studied it is expected that negative-bias temperature instability (NBTI) and hot-carrier instability (HCI) will work against the long term stability of the HELP PUF, as is true for all delay-based PUFs.

The HELP PUF described herein is the only known delay-based PUF that combines the following features: (1) The HELP PUF is entangled with the hardware in which it is embedded, in the sense that the path delays measured in, e.g., an AES core logic macro, can be used to generate a bitstring that is subsequently used as the key for use by AES in functional mode. The proximity of the bit generation to the hardware that uses the bitstring improves robustness against invasive or probing attacks designed to steal the key. (2) The bit flip avoidance scheme proposed in this disclosure significantly reduces the probability of bit-flip errors during regeneration. (3) The physical implementation of HELP uses standard hardware resources commonly available in the fabric of an FPGA, including an on-chip digital clock manager (DCM). It should be noted that J. Li, J. Lach; "At-Speed Delay Characterization for IC Authentication and Trojan Horse Detection," HOST, 2008 pp. 8-14, which is incorporated by reference herein in its entirety, describes leveraging the high timing resolution provided by a DCM for Trojan detection and IC authentication. (4) By using the core logic of AES itself, a large source of existing entropy is leveraged.

Referring again to FIG. 1, HELP PUF 1100 includes data collection engine 1100, logic 1200, serial interface 1300, PN memory 1400, and bitGen engine 1500. HELP PUF 1000 produces a bitstring using a challenge-response mechanism. The challenge component for HELP PUF 1000 may include a randomly selected, two-vector test sequence applied to the inputs of the macro-under-test (MUT). The test sequence may introduce a set of transitions that propagate through the core logic of the MUT and appear on its outputs. The responses may be defined as the measured path delays, represented as 8-bit numbers as explained below, for each of the outputs. The delays on each MUT output may be measured one-at-a-time.

Figure 2:
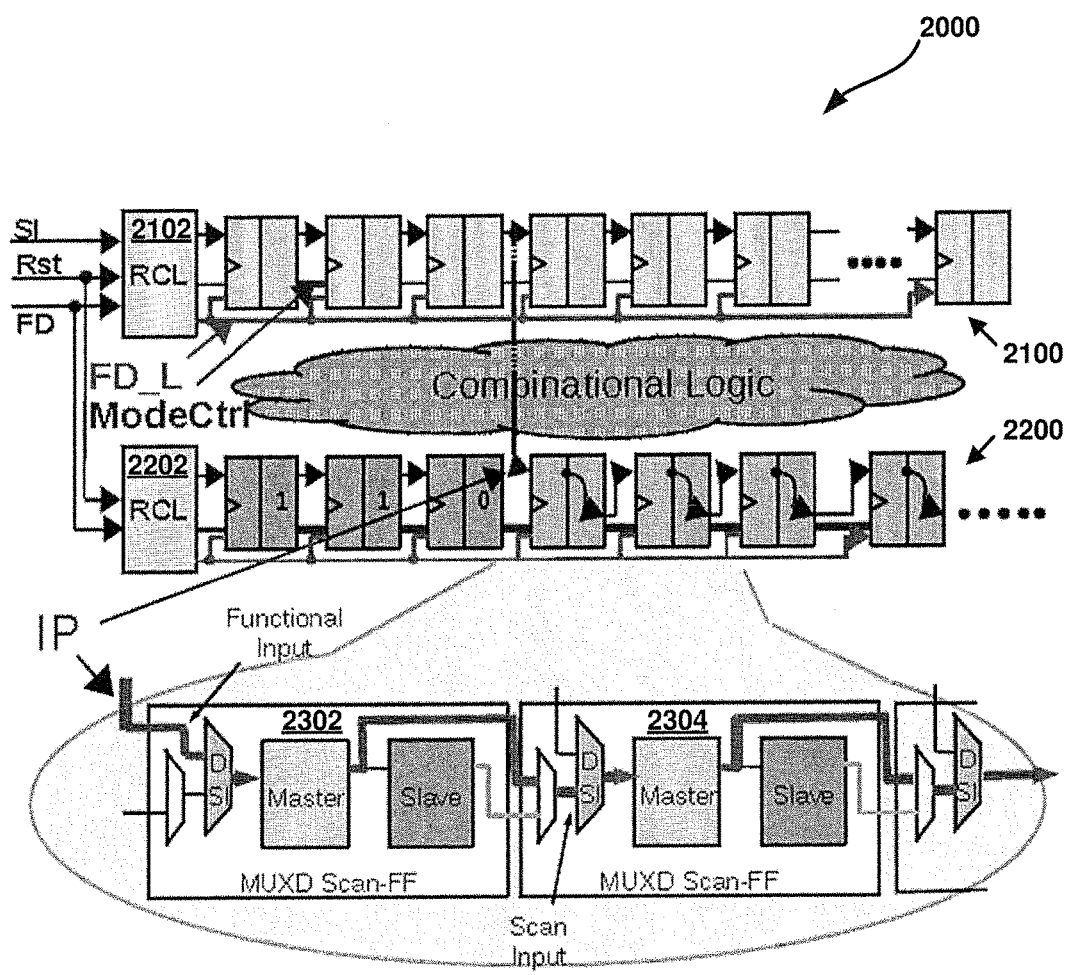
FIG. 2 is block diagram illustrating an example of an embedded test structure that may implement one or more techniques of this disclosure.

In should be noted that the precision of the delay measurement impacts the stability of HELP 1000. An embedded test structure called REBEL was used to obtain high-precision, digitized representations of the path delays. In one example, REBEL is integrated directly with the scan chain logic and uses the on-chip clock tree network for launch-capture (LC) timing events. FIG. 2 is block diagram illustrating an example of an embedded test structure that may implement one or more techniques of this disclosure. FIG. 2 depicts an overview of a REBEL test structure. As illustrated in FIG. 2, REBEL test structure 2000 includes of two rows of flip-flops (FFs), 2100 and 2200 connected together into a scan chain. Small logic blocks, 2102 and 2202, on the left of each row, labeled RCL for Row Control Logic, allow the scan elements on each row to be configured as follows: The top row 2100 is the launch row, and is configured operate in functional mode. The second row 2200 is the capture row, and is configured in 'mixed mode,' in which a specific FF, called the insertion point (IP), is chosen. This scan-FF and each scan-FF to the right of it in the row are placed in 'flush delay' mode (described below), and form a combinational delay chain, effectively extending the path at the IP.

Flush-delay mode (FD) is a special mode in which a scan chain can be configured as a combinational delay chain. This is depicted in the callout in FIG. 2, which shows two master/slave FFs, 2302 and 2304, in which the output of the first master feeds into the scan input of the second FF 2304. Any transition that occurs on the IP propagates through the functional input and into the first master using logic that selects that path (not shown). In contrast, the logic controlling the scan mux for the second FF 2304 (and all FFs to its right) selects the scan input, effectively allowing the transition to propagate unimpeded through the masters of these FFs. Details concerning the control logic for the scan chain MUXes can be found in C. Lamech, et al. "REBEL and TDC: Two Embedded Test Structures for On-Chip Measurements of Within-Die Path Delay Variations," ICCAD, 2011, pp. 170-177, which is incorporated by reference herein in its entirety.

A REBEL path delay test is carried out by scanning in configuration information, which selects the IP and configures the delay chain as shown in FIG. 2. A clock transition is then applied to the launch row FFs 2100 which generates transitions that propagate into the MUT. Any transition that occurs on the MUT output at the IP will propagate into the delay chain. By asserting the clock input on the capture row FFs 2200, the master latches revert to storage mode and digitize the time behavior of the transition(s) as a sequence of 1's and 0's. The combined delay of the MUT path and the delay chain can be derived by searching, from right to left, in the binary sequence for the FF that contains the first transition.

Referring again to FIG. 1, HELP PUF 1100 may be implemented on an FPGA. Experiments on a set of 30 HELP PUFs on a Virtex-II Pro XUP FPGA boards were carried out. The Virtex-II Pro board incorporates a 130-nm Virtex-II Pro device and permits power for the core logic to be supplied by an external power supply, which proved to be convenient for the TV corner testing carried out in experiments. It should be noted that although the Virtex-II Pro chips are fabricated in an older technology, similar (or better) results are expected to those presented using chips fabricated in more advanced technologies.

In one example, the MUT used in an implementation of HELP PUF 1100 is the logic defining a single round of a pipelined AES implementation from OpenCores. Space limitations on the Virtex-II Pro prevented inclusion of all 10 rounds of a full AES implementation. The block labeled "Initial Launch Vector (256)" in logic 1200 represents the pipeline FFs in the full-blown AES implementation, converted here to MUX-D scan-FFs. A second copy of this block, labeled "Final Launch Vector (256)" in logic 1200 is added to emulate the logic from the omitted previous round. In one example implementation, two randomly generated vectors that represent the challenge are scan-loaded into the two blocks.

The block labeled 'REBEL (Capture) Row' in logic 1200 also represents the pipeline FFs between the logic blocks defining the rounds in AES. It should be noted that this row was modified to incorporate REBEL, and designed to implement the 'mixed mode' functionality described previously in reference to FIG. 2. The number of FFs in this row is expanded from 256 to 264 to extend the delay chain for the IPs on the right end of the MUT. The remaining components in FIG. 1 define the HELP PUF engine, and can be divided into the Data Collection Engine (DCE) 1100, and the BitGen Engine (BGE) 1500. One iteration of the whole process produces the bitstring. The PUF engine behaves differently depending on whether a new bitstring is requested (a process called enrollment) or whether the bitstring needs to be reproduced (a process called regeneration). These scenarios are distinguished in the following description as needed.

The overhead of HELP 1000 is give in TABLE 1. The resources under the column 'Single AES Stage' correspond to a single stage of the pipelined AES macro. The fully pipelined version is 10× larger, and therefore, the reported overhead for HELP in the first 3 rows would reduce by a factor of 10 in a full implementation, e.g., the values in the 'LUTs' row of TABLE 1 would become '31220, 3931, 12.6%.'

TABLE 1

HELP PUF RESOURCE OVERHEAD

| | Single AES Stage | PUF w/o AES | % Overhead |
|---|---|---|---|
| Flip-flops | 1297 | 456 | 35% |
| LUTs | 3122 | 3931 | 126% |
| Slices | 2146 | 1831 | 85% |
| RAMB16 | 0 | 58 | — |
| BUFGMUX | 1 | 4 | 400% |
| DCMs | 0 | 3 | — |

DCE 1100 is configured to carry out a sequence of LC tests, measure the path delays, and record the digitized representation of them, called PUF numbers or PNs, in block RAM on the FPGA. PN Memory 1400 in illustrated in FIG. 1 is a block RAM used to store the PNs. In one example implementation, DCE 1100 runs to completion before BGE 1500 component is started. The clock generator module 1102 is configured to generate two clock signals: a launch clock and a capture clock. In one example design, clock generator module 1102 includes three digital clock managers, or DCMs. A 'master' DCM may be used to reduce the off-chip oscillator-generated 100 MHz clock to 50 MHz. The output of the master DCM drives the launch and capture DCMs. In one example, the in phase adjustment (FPA) feature of the capture DCM was utilized to 'tune' the phase relationship between the Launch and capture clocks. At 50

MHz, the FPA allows 80 ps increments/decrements in the phase shift of the Capture clock on the Virtex-II Pro chips.

In one example, when DCE 1100 is configuring the scan chains in preparation for the LC test, the phase relationship between the launch and capture clocks is set to 0. Just prior to the launch event, the controlling state machine selects the 180° phase-shifted output of the capture DCM, and the FPA feature is used to tune the phase in an iterative process designed to meet a specific goal (described in further detail below). TABLE 2 summarizes the characteristics of the capture clock.

TABLE 2

CAPTURE CLOCK PHASE ADJUSTMENT

| Phase Adj. | Phase Angle | LC Interval |
|---|---|---|
| 0 | 90° | 5 ns |
| 64 | 180° | 10 ns |
| 128 | 270° | 15 ns |

Figure 3:
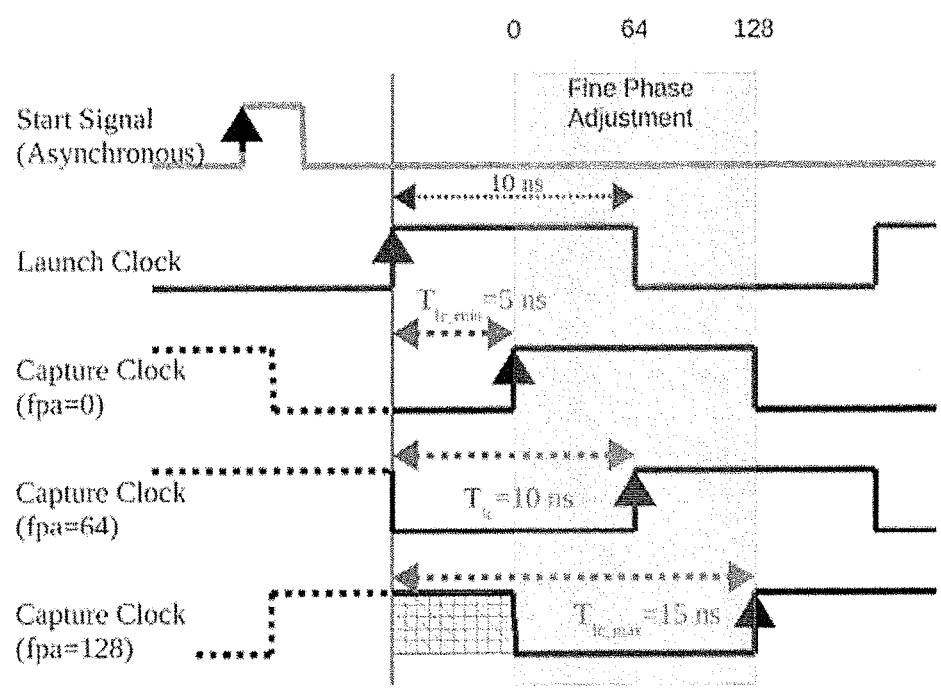
FIG. 3 is an example timing diagram illustrating one or more techniques of this disclosure.

FIG. 3 illustrates the timing relationship between the launch and capture clocks for different values of the 'Phase Adj.' control counter in the DCM. The launch and capture events occur on the rising edge of the corresponding clocks. As illustrated in FIG. 3 this allows path delays from 5 ns to 15 ns in length to be measured. The 0 to 128 range of values (called PNs) are used as a digital representation of the path delays.

Referring again to FIG. 1, LC LFSR Controller 1104 may be a 32-bit linear feedback shift register (LFSR) used to produce the randomized launch vectors. REBEL Controller 1106 may configure the IP in the REBEL row attached to the output of the AES logic block. Sample Analysis Engine (SAE) 1108 may analyzes the digitized results in the delay chain after each LC test for a given path and determines whether the path is 'valid.' A valid path is defined as one that has a real transition, is glitch-free, and produces consistent results across multiple samples. Valid Path Memory 1401 may include a block RAM used to record a pass/fail flag for each tested path that reflects its validity (as defined under SAE). These values may technically be stored during enrollment and then read back in from non-volatile or off-chip memory (public storage) during the regeneration process, and represent the helper data needed in the regeneration process.

Random Pairing Generator 1502 included in BitGen Engine 1500 may be configured to uses a 28-bit LFSR to generate randomized pairings of PNs for bit generation. Stop Point Memory 1504, which may be referred to as strong Bit Memory, includes a block RAM used by the Bit Generation Engine 1500 to record 'stop points' or 'strong bits' (depending on the bit generation method in use, described in further detail below) during enrollment. The values stored in this memory, like the Valid Path Memory 1401, are also components of the helper data. In the example illustrated in FIG. 1, serial interface component 1300 is used to interact with the HELP engine, and to transfer the results of the path testing and bit generation processes.

In one example of path delay measurement using HELP PUF 1000, a sequence of paths are tested by the DCE 1100 process to produce the PNs used later in bit generation. The starting point and order in which the paths are tested is determined by the LC LFSR within LFSR controller 1104. The DCE 1100 process begins by loading the LC LFSR with a seed (provided by the user), and instructing the LC LFSR controller 1104 to load a random pair of vectors into the launch rows. Simultaneously, REBEL controller 1106 configures the REBEL row with a specific IP and places the REBEL row in FD mode. In example, the same random vector pair is reloaded to test each of the 256 IPs, one at a time, before the LC LFSR generates and loads the next random vector pair.

A key contribution of this technique is the discovery that path stability can be used as the basis for random bitstring generation. Path stability is defined as those paths which have a rising or falling transition, do not have temporary transitions or glitches, and that produce a small range of PNs (ideally only one) over multiple repeated sampling. As is shown below, the paths that pass the stability test are different for each chip in the population.

A state machine within the DCE 1100 may be responsible for measuring path delays and for determining the stability of the paths. One example algorithm begins testing a path by setting the FPA to 128, which configures the Capture clock phase to 270°. It then iteratively reduces the phase shift in a series of LC tests, called a sweep. For paths that have transitions, the process of 'tuning' the FPA toward smaller values over the sweep effectively 'pushes' the transition backwards in the delay chain, since each successive iteration reduces the amount of time available for the transition to propagate. When the edge is 'pushed back' to a point just before a target FF in the delay chain, the process stops (the goal has been achieved). The target FF is an element in the delay chain that is a specific distance (in FFs) from the IP. The value of the FPA at the stop point is saved as the PN for this path, i.e., the PN represents the 'response' to the 'challenge' defined by the launch vector and IP.

Evaluating path stability may be accomplished by counting the number of transitions that occurred in the REBEL row by "XOR-ing" neighboring FFs in the delay chain. The path may be immediately classified as unstable (and the sweep is halted) if the number of transitions exceeds 1 at any point during the sweep. Once the sweep is complete, the whole process may be repeated multiple times. If the range of PNs measured across multiple samples varies by more than a user-specified threshold, the path is classified as unstable and is discarded. It should be noted that in one example, path stability evaluation occurs only during enrollment. In order to make it possible for regeneration to replay the valid path sequence discovered during enrollment, in one example, the 'valid path' bitstring is updated after testing each path. For paths considered valid, a '1' may be stored and for those classified as unstable (or have no transition), a '0' may be stored. During regeneration, the exact same sequence of tests can be carried out by loading the LC LFSR with the same seed and using the 'valid path' bitstring to determine which paths are to be tested (a '1' forces the path to be tested, and a '0' forces the path to be skipped).

In should be noted that temperature and voltage can vary between enrollment and regeneration, which will introduce variations in path delays. The modulus technique that described below requires the PNs to remain as constant as possible during regeneration at different TV corners, and therefore it is necessary to calibrate for these types of environmental effects. A developed a calibration technique called Temperature/Voltage Compensation or TVCOMP to deal with TV variations is described herein. The principle behind TVCOMP is to derive a constant during regeneration that, when added to all PNs, shifts the PN distribution so that it matches the distribution obtained during enrollment. Calibration is carried out by computing a 'mean PN' during enrollment from a small subset of tests (64 test were found to be sufficient) which is then recorded as helper data. Later, during regeneration, the mean is again computed using the same set of tests and the difference between the two mean values is added as a 'correction factor' to the PNs obtained during regeneration. In experiments, these correction factors were found to be in the range from −8 to +14 PNs, depending on the TV corner.

Unfortunately, in some cases, not all types of path delay variations can be compensated for using TVCOMP. In particular, it was found that a small number of the PNs tend to "jump" to new values well beyond that predicted by the correction factor. Although these jumps are exacerbated by TV variations, the underlying cause for the jump behavior is the appearance and disappearance of 'hazards' on off-path inputs to gates along the paths-under-test (PUT), Under certain TV conditions, it is possible that an off-path input (which normally remains at its non-dominant value, e.g., a '1' on an input to an AND gate) changes momentarily to a dominant value. Depending on the relative timing between the appearance of the hazard and the actual signal transition along the tested path, it is further possible that the actual signal transition is momentarily delayed by the hazard. When this occurs, a fundamental change occurs in the path timing. Unfortunately, there is no way to predict or compensate for these situations short of running fault simulations and enforcing constraints during test vector generation. This jump behavior is the principle reason for the bit flips that occur in the reported results provided below.

Most PUF are designed using identical circuit primitives as a means of avoiding bias. This is not the case for HELP 1100, because the PUTs vary widely in length. A developed technique called 'Dual-PN Count' (DPNC) which post-processes the PNs to eliminate this bias, is described herein. The DPNC technique may be implement in DPNC logic 1506. The technique applies a modulus operation to the PNs, which 'trims off' the higher order bits of the path delay measurement. The truncation of the PNs effectively reduces all path delays to a range upper-bounded by the modulus, i.e., it makes short paths out of long paths and allows unbiased comparisons to be made along all paths. The trimmed PNs, called Mod-PNs, are then partitioned into two groups for bit generation purposes.

Figure 4:
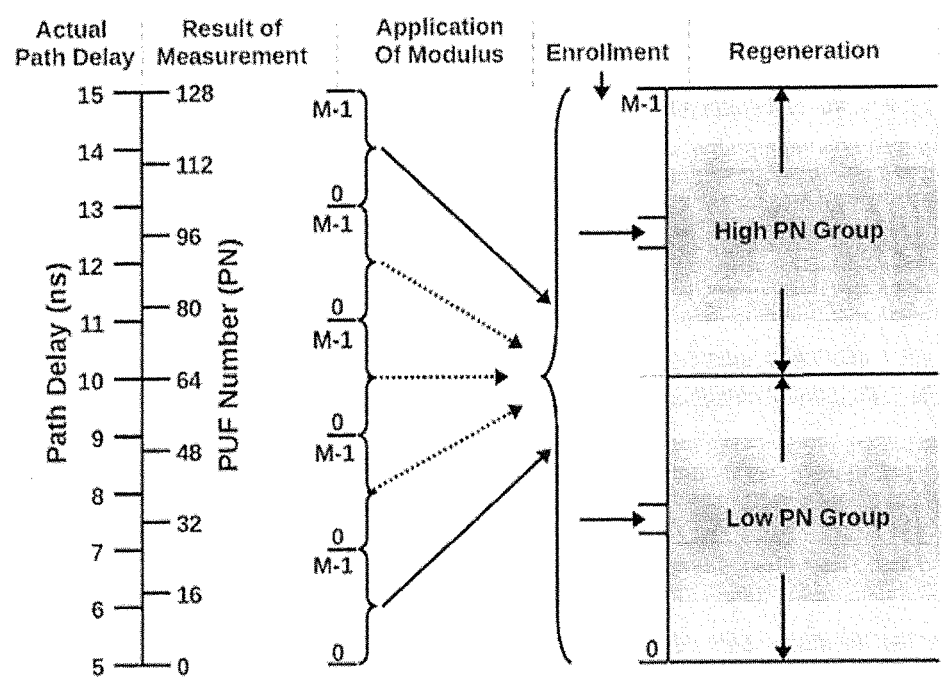
FIG. 4 is a conceptual diagram illustrating one or more techniques of this disclosure.

The diagram in FIG. 4 provides a graphical depiction of this two-step process. The process begins on the left using a PUT with a delay between 5 ns and 15 ns. The measured PN for this example PUT is originally in the range 0 to 128, but the modulus operation reduces it to a number in the range of 0 to M−1 (where M is a user-specified modulus). The right-most portion of the diagram in FIG. 4 shows the partitioning of the Mod-PNs into two groups, where values in the range of 0 to M/2−1 are placed in the low PN group, while PNs in the range of M/2 to M−1 comprise the high PN group. As indicated above, TV variations are not completely compensated for by TVCOMP. This issue is dealt with by discarding additional PNs (beyond those discarded because of path stability problems as described above). In particular, Mod-PNs that fall into regions outside those delineated in the center portion of FIG. 4 are considered invalid during enrollment. This allows valid PNs, i.e., those that fall within the center portions, to 'shift' during regeneration by up to M/4 in either direction before causing a bit flip. Therefore, this scheme both eliminates bias and adds bit flip resilience to HELP.

It should be noted that while the filtering operations described above may be sufficient to eliminate the adverse effects on delay introduced by noise and TV variations, large changes in the Mod-PNs introduced by "jumps," as described in above may require a more resilient technique. The rare nature of "jumps" makes it possible to develop a bit-flip avoidance technique that imposes a low area and time overhead. The 'Count' term in DPNC refers to this feature of the method, and characterizes the process used to generate bits, which is described as follows. In one example, during enrollment, DPNC parses the valid PNs until it encounters a sequence of k consecutive values from the same group, where k is an odd-numbered, user-specified threshold. Two counters track the length of a sequence of PNs from the same group. As each PN is read, the counter for the corresponding group is incremented, while the other group's counter is reset to 0. When either of the counters reaches k (indicating that the k most recent PNs belong to the same group), a new bit is generated and added to the bitstring, and a 'stop point' flag is set in stop point memory 1504 to indicate that a bit was generated at this point. In one example, the value of the generated bit is a '1' if the PNs are from the high PN group, and a '0' if the PNs are from the low PN group. During regeneration, the stop point flags (represented as a bitstring) are consulted to determine when bit generation occurs. Therefore, the bitstring of stop point flags represents additional helper data.

Figure 5:
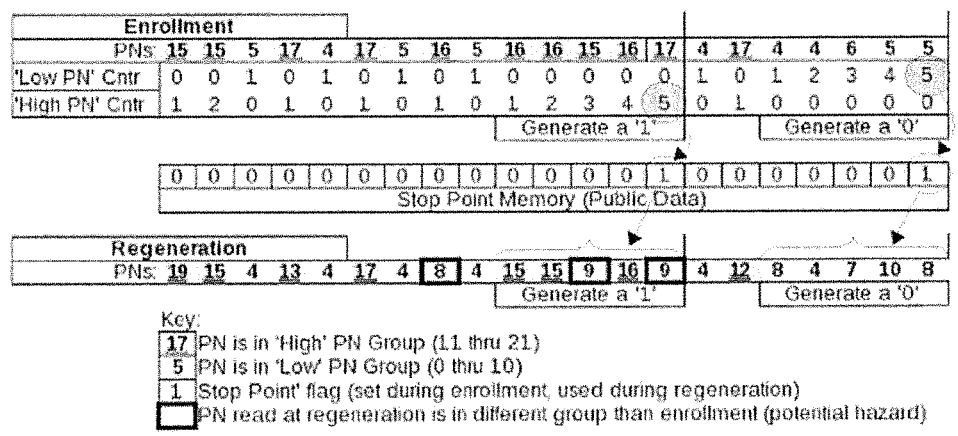
FIG. 5 is a conceptual diagram illustrating one or more techniques of this disclosure.

An example of the DPNC process is shown in FIG. 5. In the example illustrated in FIG. 5, the modulus is set to M=22, and the range of valid PNs accepted in the low PN bin are given by {4,5,6}, while the valid PNs for the high PN bin are defined as {15,16,17}. The value of counter k is set to 5. This example first depicts the enrollment process, in which PNs are read from the on-chip memory, left to right, as shown in the top of FIG. 5. Also shown are the states of the counters after each PN is read. When the high PN counter reaches 5 (as shown in the circle), a '1' bit is generated and added to the bitstring (not shown), and a '1' is written to the current location in the Stop Point Memory 1504. At this point, both counters are cleared and the process continues until a second bit (a '0' in this case) is generated. The bitstring is built up in this fashion one bit at a time, until a user-specified number is reached.

The bottom portion of FIG. 5 illustrates the process carried out during regeneration. Here, the '1' bits in the Valid Path Memory (not shown) indicate which paths were used for bit generation during enrollment, and dictate now those paths that must be re-tested for proper regeneration. Similarly, the '1' bits in Stop Point Memory 1504 force bits to be generated at these points (the counters are not consulted). The counters, however, are consulted to determine the value of the generated bit, which is determined by the larger of the two counter values. In the example, two of the five values that were in the high PN bin during enrollment have 'flipped' and now appear in the low PN bin (see elements highlighted with the heavy borders in FIG. 5). However, because the majority, three out of five, are high PNs, the algorithm correctly regenerates a '1' bit despite the presence of the erroneous measurements. It should also be noted that the first erroneous measurement (the '8' in the heavy border) is of no consequence because it is not part of the consecutive sequence of 5 PNs that are consulted to determine the value of the bit (these 5 PNs are identified in the figure with a curly bracket).

In Aarestad et al., "HELP: A Hardware-Embedded Delay PUF," IEEE Design & Test, Volume: PP, Issue: 99, March/April, 2013, pp. 1-8, which is included by reference herein in its entirety, a HELP PUF and a bit generation technique called Universal/No-Modulus (UNM) is presented. A variant of this UNM technique in investigated herein. Unlike the DPNC described above, UNM leverages the randomness associated with the stability of paths across chips, as described above, and therefore it does not need to calibrate for bias, i.e., UNM can compare short paths with long paths directly without truncating the high order bits of the PNs as is true for DPNC. The technique described in Aarestad et al. defines a low and a high PN bin (similar to DPNC), but with the bins defined in this case over the entire path distribution range from 0 to 128. A large margin of approximately 100 is created between the bins to allow for shifts and jumps in the PNs during regeneration. The original technique therefore discards a large fraction of PNs that fall within this margin during enrollment (beyond those discarded because of path stability problems as described above).

The variant described here is referred to as 'UNM Difference' or UNMD. In UNMD, the fixed margin is replaced with the concept of a noise threshold, discussed below. By doing so, UNMD does not discard stable PNs as is true of UNM, but rather preserves and makes use of all PNs generated by the DCE. This feature reduces the workload imposed on the DCE 1100 to find a suitable set of PNs that meet a bitstring target by 95.8% when compared with the original fixed threshold technique. As is shown below, UNMD offers significant advantages in both running time and memory requirements.

Figure 6:
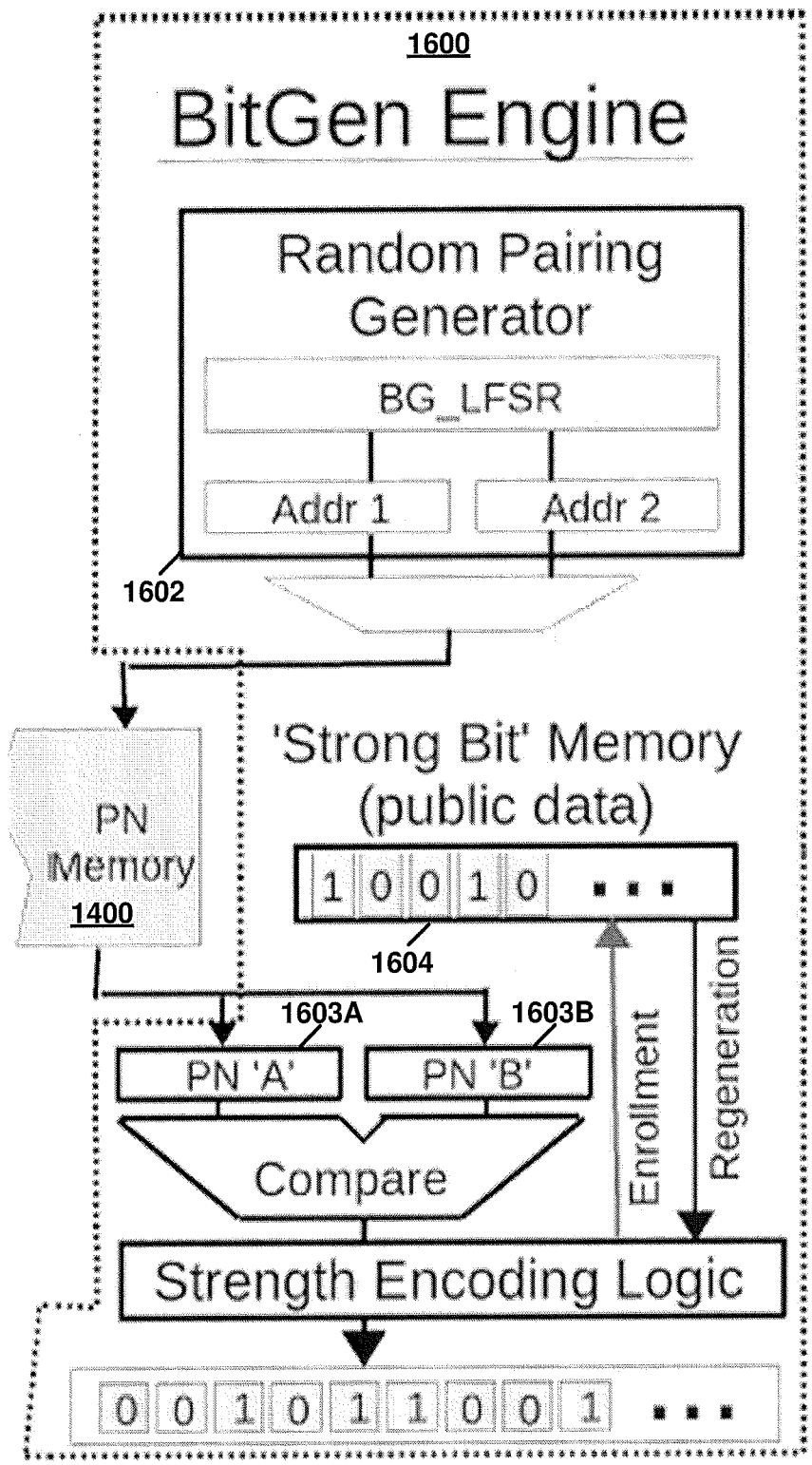
FIG. 6 is a block diagram illustrating an example component of Physically Unclonable Function (PUF) that may implement one or more techniques of this disclosure.

In one example, all components except for the BitGen Engine are identical for both the DPNC and UNMD techniques. An example of a BitGen Engine for UNMD, is illustrated in FIG. 6. BitGen Engine 1600 is configured to randomly select two PNs to compare (unlike DPNC which parses the PNs one at a time as shown in FIG. 5). In the example illustrated in FIG. 6, Random Pairing Generator 1602 produces the two addresses of the PNs to compare and the values are read from on-chip memory into a pair of registers 1603A and 1603B (PN 'A' and PN 'B'). PN 'B' is then subtracted from PN 'A' to produce a PN difference. The magnitude of the difference determines the strength of that pairing, as discussed below. If the difference is sufficiently large, then the sign of the comparison determines the value of the generated bit. A negative sign produces a '0', and a positive sign produces a '1'.

Figure 7:
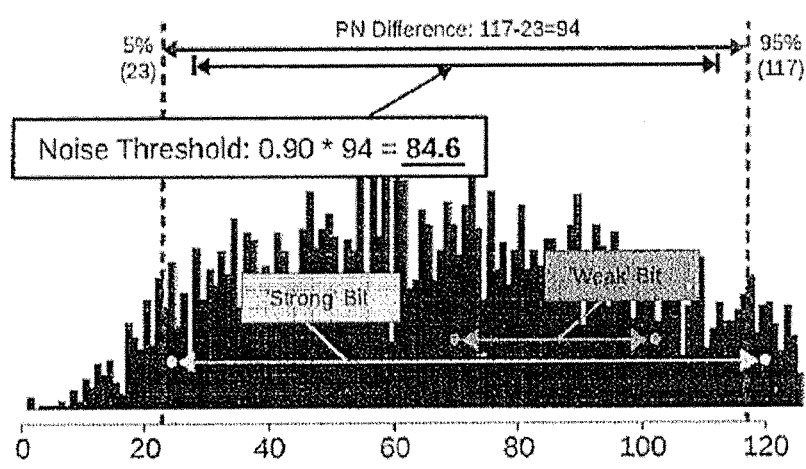
FIG. 7 is a conceptual diagram illustrating one or more techniques of this disclosure.

A thresholding technique similar to that described in Chakrabory et al., "A Transmission Gate Physical Unclonable Function and On-Chip Voltage to Digital Conversion Technique," DAC, 2013, which is incorporated by reference in its entirety may be used to decide if a given comparison generates a strong bit (which is kept) or a weak bit (which is discarded). In one example, thresholding works as follows. During enrollment, a noise threshold is defined using the path distribution histogram for the chip. The histogram is constructed using all n PNs collected by the DC engine 1100. The noise threshold is then computed as a constant that is proportional to the difference between the PNs at the 5 and 95 percentiles in this distribution. Therefore, each chip uses a different threshold that is 'tuned' to that chip's overall (chip-to-chip) delay variation profile. For each comparison, the difference between the two PNs may be compared against the noise threshold. A strong bit is generated if the magnitude of the difference exceeds the threshold, otherwise the bit is discarded. Simultaneously, a bit is added to the Strong Bit Memory 1604 shown in FIG. 6 that reflects the status of the comparison, with a '1' indicating a strong bit and a '0' indicating a weak bit. During regeneration, the Strong Bit Memory 1604 is consulted to determine which comparisons are used to regenerate the bitstring. FIG. 7 shows the path distribution for a typical chip. The dashed lines in FIG. 7 indicate the 5 and 95 percentiles, with PNs of 23 and 117 respectively. The difference between these PNs is multiplied by a noise margin (0.90 in this example) to compute a noise threshold of 84.6. Pairings which differ by more than this threshold may form 'strong' bits, while pairings that differ by less than this threshold are deemed to be 'weak' and will be discarded. The 'pairings' shown in FIG. 7 illustrate this concept.

Figure 8A:
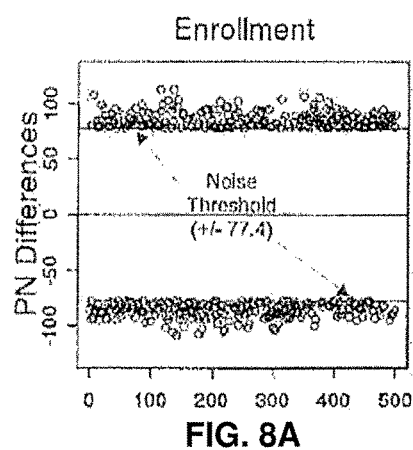
FIG. 8A-8B are example graphs illustrating one or more techniques of this disclosure.
Figure 8B:
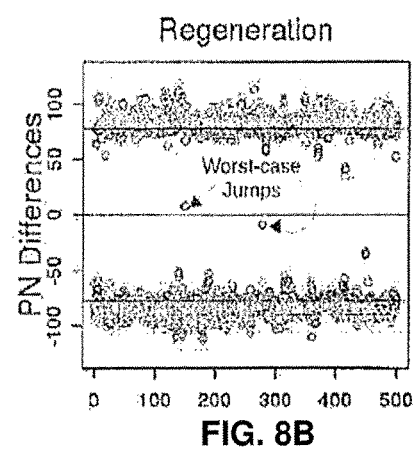

Above, "jumps" are described as a worst-case condition and may represent one of the biggest challenges in dealing with bit flips. Both DPNC and UNMD are adversely impacted by jumps. In experiments, some path delays changed because of jumps by as much as 4.5 ns, or 58 PNs, at different TV corners. Moreover, the PN differences computed by UNMD exacerbate the problem, where jumps in two path delays can combine in a worse-than-worst-case fashion. This is illustrated in the graphs of FIGS. 8A-8B, which depict data from one of the Virtex-II boards. The graphs illustrated in FIGS. 8A-8B plot the 'strong bit' number along the x-axis against the PN differences on the y-axis, with the noise thresholds (as described above) set to ±77.4 for this Virtex-II board. The data points from enrollment in the graph illustrated in FIG. 8A all fall above or below these thresholds (by definition), but data points from measurements taken at different TV corners in the graph illustrated in FIG. 8B 'infringe' into the space between the thresholds. Most data points remain close to the thresholds, but some move significantly (because of jumps), as highlighted, by as much as 5.6 ns or 71 PNs. By choosing a conservative noise threshold, bit flips caused by jumps such as those shown in FIGS. 8A-8B can be avoided. However, a different strategy may be needed in cases where the application requires the probability of a bit-flip to be negligibly small (e.g., encryption). A technique is proposed in Chakraborty et al. that is based on a popular fault tolerant technique called triple modular redundancy (TMR), which is capable of reducing the probability of failure to values below 1e-11. The method constructs three copies of the bitstring (using the abundance of bits provided by the PUF) and uses majority voting to construct the final bitstring. The probability of a bit-flip error is significantly reduced because any single bit-flip that occurs in any column of bits defined by the three copies can be tolerated. The Probability of failure is investigated below.

Environmental experiments were conducted on 30 Virtex-II Pro boards using a thermoelectric cooler (TEC) apparatus and a programmable power supply. As indicated above, each board was tested at 9 TV corners, defined by all combinations of three temperatures, 0° C., 25° C., and 70° C., and three voltages, 1.35V, 1.50V and 1.65V. Data collected at 25° C. and 1.50V is treated as enrollment data while the data collected at the remaining 8 TV corners is treated as regeneration data.

Inter-chip Hamming Distance (HD) measures uniqueness of the bitstrings across boards, and is computed by counting the number of bits that are different in the bitstrings from each pairing of boards. An average inter-chip HD is computed using the results from all possible pairings, which in experiments was 30*29/2=435. The inter-chip HDs are typically converted into percentages by dividing each of them by the length of the bitstrings. The best achievable average HD under these conditions is 50%. Intra-chip HD, on the other hand, is the number of bits that differ in two bitstrings obtained from the same chip, but tested under different environmental conditions. The ideal intra-chip HD is zero, and a non-zero value indicates that one or more bit flips occurred during regeneration. In experiments, intra-chip HDs were computed across the 9 TV corners for each board and then an average was computed using the 9*8/2=36 individual HDs. The 'average-of-the-averages' was then computed using the average HDs from all boards.

Figures 9A, 9B:
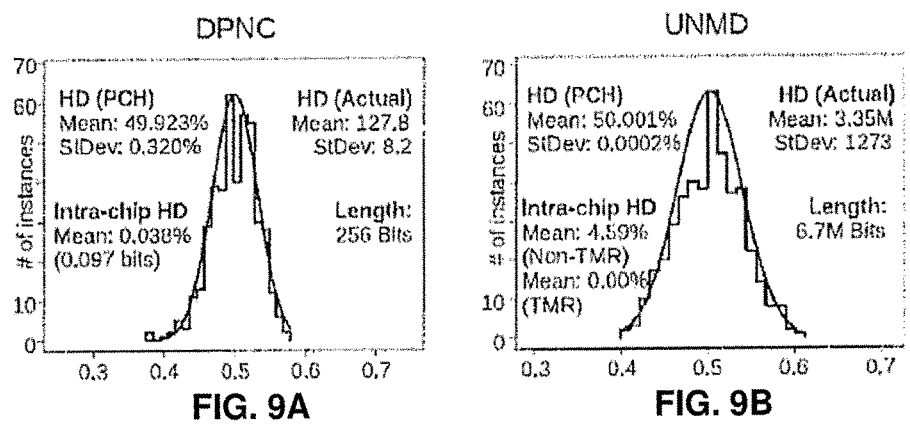
FIG. 9A-9B are example graphs illustrating one or more techniques of this disclosure.

FIGS. 9A-9B shows histograms for the inter-chip HDs and other statistical results obtained for the DPNC and UNMD techniques.

In the conducted experiments, the length of the bitstrings using the DPNC technique was 256 bits. The average inter-chip HD as illustrated in FIG. 9A was 49.923%. In FIG. 9A, a Gaussian curve is shown fitted on top of the inter-chip HD distribution as a means of illustrating its expected behavior. The standard deviation of the normal curve is 8.192 (where smaller is better). This value is consistent with the expected standard deviation of a normally distributed set of random values. The average intra-chip HD for the DPNC technique was 0.038%. The non-zero value indicates that bit-flips occurred with a frequency of 0.097 bitflips per 256-bit string. In the conducted experiments, the length of the bitstrings for the UNMD technique was 6,698,512. FIG. 9B plots the inter-chip HD distribution. The average inter-chip HD was 50.001%. The intra-chip HD using the bitstrings prior to applying is 4.59%, which became 0% after applying TMR.

To test the randomness of the bitstrings produced by the HELP PUF, a statistical test suite provided by the National Institute of Science and Technology, or NIST was used. These tests were applied to the bitstrings from the 30 boards. All of the bitstrings generated by the DPNC method passed each of the tests in the subset of NIST tests that are applicable to 256-bit strings. The bit sequences generated by the UNMD method were sufficiently long that all 15 NIST tests are applicable. All 15 test passing, with no fewer than 28 boards passing any one test (the number required by NIST for a test to be considered 'passed').

Experiments were conducted to analyze running time. Bitstring generation times for HELP are reported here as the average number of bits generated per minute, excluding serial data transfer time. During enrollment, the time required to generate each bit depends on several factors, including the percentage of tested paths that are stable, the value of k (the number of consecutive copies of a value required to produce a bit), and the number of PNs that are read from memory before encountering k consecutive copies. For DPNC, with k=S, the average number of paths tested for each generated bit during enrollment was 1,261, due to the highly selective nature of the DPN binning algorithm described above. Bits were generated at an average rate of 36.4 bits per minute. During regeneration, since only valid paths were measured, the average bit generation rate increases to 167 bits per minute.

For UNMD, on average, the data collection engine 1100 tested 3.92 paths for each of the 4,096 valid PNs that we collected across 30 boards. On average, 22.35 paths were tested, at up to 12 samples per path, for stability every second. For the UNMD analysis, the PNs were collected by the HELP PUF engine, while the bit generation process was completed off-chip using a software program. This was done to allow evaluation of a range of noise thresholds without needing to re-collect the PNs each time. As a result, the FPGA running time of the bit generation process for UNMD is not known.

Figure 10A:
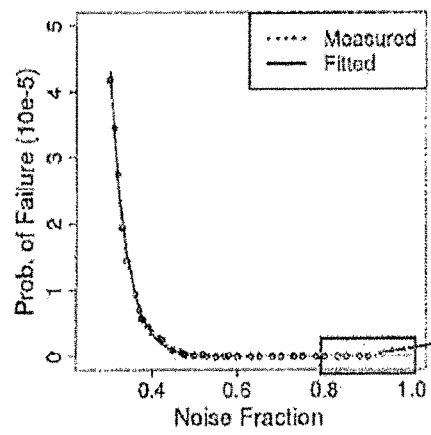
FIG. 10A-10B are example graphs illustrating one or more techniques of this disclosure.
Figure 10B:
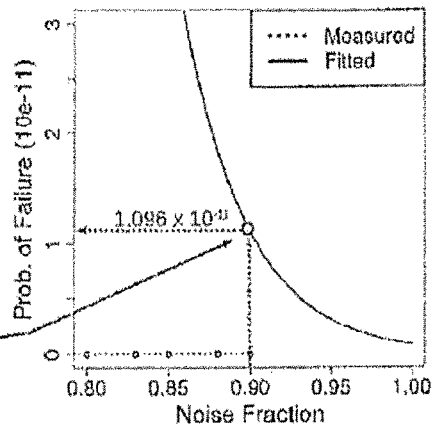

Experiments were conducted to analyze the probability of failure. For DPNC, there were a total of 9 unique errors that resulted in 19 bit flips during the 240 regenerations that were performed during the experimentation. The overall single-bit probability of failure (POF) is $3.09 \times 10^{-4}$ (19 errors per (30 boards*8 regenerations per board*256 bits per regeneration)). 16 of these 19 bit flips occurred when the core logic voltage of the FPGA was 10% lower than nominal. The POF analysis for the UNMD method was performed as two analyses: the POF for the initial bitstring and the POF for the TMR-based bitstring described above. Both of these analyses involved generating bitstrings at all 9 TV corners across a range of noise thresholds. In each case, the number of bit flips that occur at each noise threshold was recorded, and then fit an exponential curve to this data. The exponential fit allows expected error rates for noise thresholds to be modelled far higher than those at which bit flips actually occur in our empirical results. For the initial bitstrings, a theoretical error rate of $1.54 \times 10^{-6}$, or 1 bit flip in approximately 650,000 bits generated was computed. FIG. 10A illustrates the actual and theoretical error rates for each of the TMR-based bitstrings. FIG. 10B shows an enlarged view of the theoretical error rate at a noise margin of 0.90. At this noise threshold, a POF is $1.096 \times 10^{-11}$ bit flip in approximately 91 billion bits generated.

The HELP PUF, when using the UNMD method, is capable of generating reliable, cryptographic-strength bitstrings of up to several million bits in length. IT should be noted, however, that an adversary with access to the simulation model of the target system may be able to "reverse engineer" the secret bitstring. While this vulnerability would be difficult to exploit, the only way to completely eliminate the threat is to obfuscate the Valid Path Memory component of the public data. Because the DPNC method is not subject to this vulnerability, in one example, DPNC may be used to generate a small (32 to 64 bits) bitstring that can be used to obscure the public data produced by the UNMD technique using the same set of PNs during the enrollment process. The public data for this short bit string may be added to the obfuscated UNMD public data. At the start of regeneration, the un-obscured public data for the DPNC method may be used to regenerate the short bitstring, which may then be used to unveil the public data for the UNMD regeneration process.

As described above, HELP is unique because it does not measure and analyze within-die variations between identically designed structures, as is true for PUFs based on SRAM, ROs, delay chains, etc. Instead, it derives entropy from a tool-synthesized circuit macro, where paths of widely varying lengths are present. Consequently, the source of entropy for HELP is not based on raw path delays, because doing so would result in significant levels of undesirable bias. For example, comparing a short path with a long path would always yield the same result in every chip. Instead, randomness is distilled from the stability characteristics of the paths and the high frequency behavior of within-die variations, as we will illustrate in this paper.

As described above, in one example HELP may be implemented using an instance of an Advanced Encryption Standard core logic macro implemented on a set of FPGA boards. In the example described below, HELP is implemented in a 90 nm ASIC using a IEEE-754 compliant floating point unit (FPU) as the core logic macro. Results are presented using data collected from multiple instances of the test chips. Differences in the path stability and within-die variation characteristics of FPGA and ASIC implementations, as well as differences in the internal connectivity of core logic macros themselves, impact the effectiveness of bitstring generation techniques methods. In particular, techniques that rely entirely on path stability as the source of entropy may break down in the FPU ASIC implementation, while techniques based on the high frequency behavior of within-die variations improve, particularly w.r.t. reliability, over the FPGA implementation.

In should be noted that although core logic macros provide a rich source of entropy, reconvergent-fanout in their connectivity structure may cause significant amounts of glitching on the path outputs, which increases the probability that bit flips will occur during the bitstring regeneration process. Moreover, the glitching behavior is affected by supply voltage conditions (and temperature to a lesser degree). Therefore, some techniques for measuring path delays, e.g., those that vary the launch-capture clock interval in a sequence of tests, may not be effective for quickly identifying and eliminating glitchy paths and obtaining accurate path delay measurements for stable paths. C. Lamech, et al. "REBEL and TDC: Two Embedded Test Structures for On-Chip Measurements of Within-Die Path Delay Variations", ICCAD, 2011, pp. 170-177, which is incorporated by reference in its entirety proposed an embedded test structure (ETS) called REBEL that is designed to deal with these challenges.

In one example, REBEL is integrated directly into the scan-chain logic already present in the core logic macro and allows the temporal behavior of a signal to be captured as a digital snapshot using a single launch-capture event. It should be noted that the implementation described in Aarestad et al. "HELP: A Hardware-Embedded Delay-Based PUF," IEEE Design and Test of Computers, Vol. 30, Issue: 2, March, 2013. pp. 17-25, which is incorporated by reference in its entirety uses a MUX-D-style scan chain, while in one example the ASIC chip described herein uses a CLSSD-style scan chain. The digital snapshot is similar to that produced by a bench-top logic analyzer, which digitizes the voltage behavior, but preserves the analog delay characteristics of a signal over time. The digital snapshots produced by REBEL significantly improve the ability of HELP to make good decisions about which path delays to use in the bitstring generation process. REBEL also allows timing information to be obtained for very short paths in the core logic macro and, by extending the physical length of the path, REBEL improves the robustness of the delay measurement process by allowing narrow glitches to die out.

In the ASIC implementation described herein, HELP applies random test vectors to each of the five pipeline stages of the FPU while REBEL is used to time the combinational logic paths between each of the pipeline stages. The HELP PUF is evaluated at 9 temperature/voltage (TV) corners defined using all combinations of temperatures −40° C., 25° C. and 85° C. and supply voltages of nominal, +10% of nominal and −10% of nominal Inter-chip hamming distance (HD), intra-chip HD and the NIST statistical tests are used to evaluate the quality of the bitstrings. The resilience of the HELP bitstring generation algorithms to reverse engineering and model building attacks are also discussed as appropriate.

Figure 11:
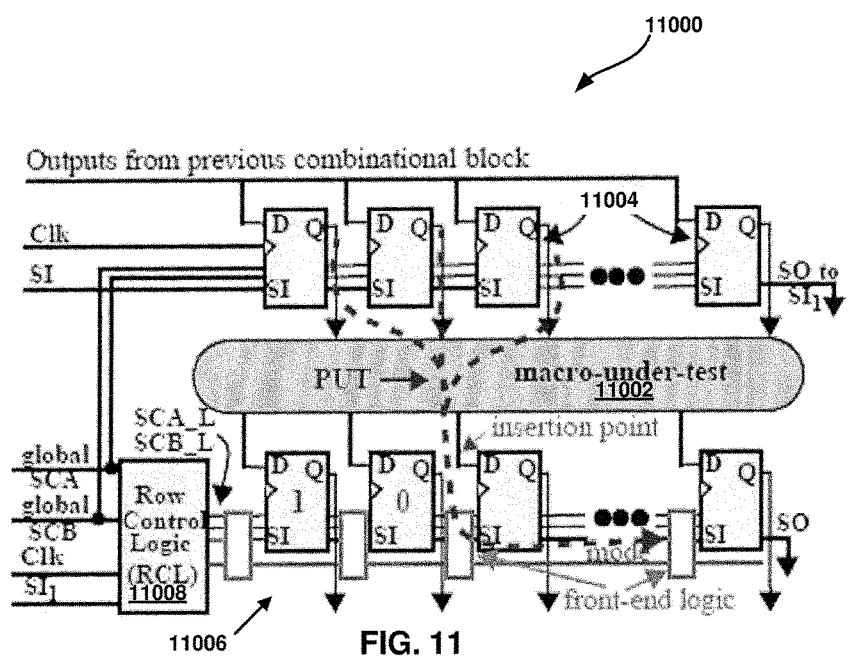
FIG. 11 is block diagram illustrating an example of an embedded test structure that may implement one or more techniques of this disclosure.

Modifications needed to integrate REBEL into a clocked-LSSD-style (CLSSD) scan architecture are described with respect to FIG. 11. FIG. 11 is block diagram illustrating an example of an embedded test structure that may implement one or more techniques of this disclosure. The macro-under-test (MUT) 11002 in FIG. 11 is the combinational logic from a core logic macro. A row of scan flip-flops (FFs) 11004 is shown along the top which serve to launch transitions into the MUT 11002. The bottom row 11006 is used to capture transitions that propagate through the MUT 11002. As illustrated in FIG. 11, REBEL ETS components are integrated into the bottom row 11006 and are labeled 'Row Control Logic' and 'front-end-logic.'

Transitions can be launched into the MUT 11002 using standard manufacturing delay test strategies such as launch-off-capture and launch-off-shift. Examples of standard manufacturing delay test strategies are described in M. L. Baseline and V. D. Agrawal, "Essentials of Electronic Testing, for Digital, Memory and Mixed-Signal VLSI Circuits," Kluwer Academic Publishers, 2000, ISBN: 0-7923-799-1-8, which is incorporated by reference in its entirety. In either of these two scenarios, the scan chain is loaded with the first pattern of the 2-pattern delay test and the system clock (Clk) is asserted to generate transitions in the MUT 11002 by capturing the output of a previous block or by doing a 1-bit shift of the scan chain. The transitions that propagate through MUT 11002 emerge on some of its outputs. REBEL 11002 allows only one of these transitions to be measured at a time in a specific region of the MUT 11002, as indicated in FIG. 11 by the label PUT for path-under-test. The PUT's transition normally drives only the D input on the capture FF. However, the REBEL component labeled 'front-end' logic (described in detail below) allows this transition to be diverted to the scan input (SI) on the FF. This special logic also converts all scan FFs to the right of this insertion point FF into a delay chain. A digital snapshot of the signal as it propagates along the delay chain can be obtained by de-asserting Clk. The digital snapshot can be used to determine the timing of the PUT, and because it captures the temporal behavior of the PUT, it can also be used to determine if any glitching occurred. This is a unique and powerful feature of REBEL 11000 that will be fully exploited in techniques described herein.

In one example, a special mode called flush-delay (FD) can be used to implement the delay chain in CLSSD-based scan architectures. FD mode is enabled by asserting both the scan A and B clock signals simultaneously. These signals are labeled global SCA and global SCB in FIG. 11. With both signals asserted, both the master and slave of a scan FF are transparent, allowing any transitions on SI to propagate through both latches after a time $\Delta t$ that represents the delay. In addition to the designer-specified functional and scan modes, REBEL 11000 in some examples, may be required to implement two additional modes in the capture scan FFs shown along the bottom of FIG. 11. In particular, the scan FFs to the left of the insertion point may need to preserve their contents during the Clk launch-capture (LC) event, while the FFs to the right of the insertion point may need to implement the delay chain. In one example, these two modes are realized using the RCL block 11008, a special scan chain encoding and the front-end logic shown in FIG. 11. The mode is controlled by configuring two FFs in the RCL block (as described below) while the scan chain encoding serves to specify the insertion point of the PUT.

Figure 12:
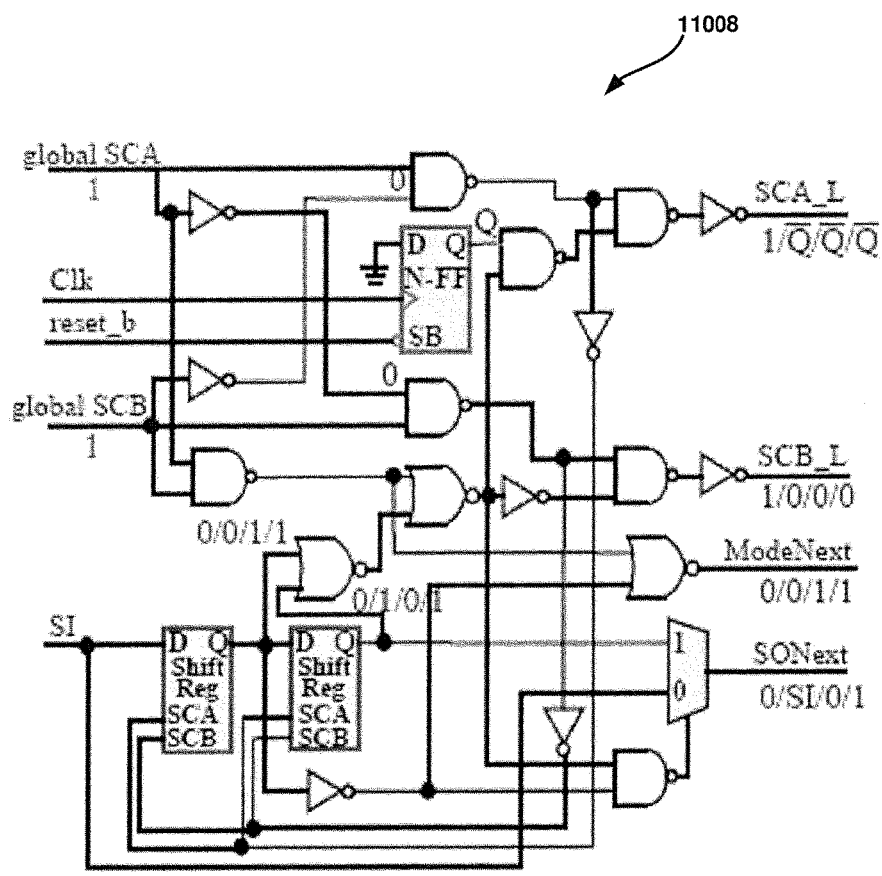
FIG. 12 is a schematic diagrams of a circuit that may implement one or more techniques of this disclosure.

FIG. 12 shows a schematic diagram of an example RCL. As illustrated in FIG. 12, the top portion of RCL block 11008 controls local (row-specific) scan clock signals, labeled SCA_L and SCB_L (_L for local) while the bottom portion contains two shift registers (Shift Reg) and mode select logic. A large portion of the RCL logic 11008 is dedicated to allow the scan FFs in the capture row, hereafter referred to as row-FFs, to operate in functional or scan modes. The chip-wide scan signals, global SCA and global SCB, are used to control the operational mode of the chip. When both are low, functional mode is in effect. Scan mode is implemented when these signals are asserted in a non-overlapping fashion. The timing mode used by REBEL 11000, called REBEL mode, is in effect when both of these signals are asserted, as illustrated by the annotations in FIG. 12.

When REBEL mode is in effect, the specific sub-mode of operation of the associated row-FFs is determined by the two shift registers. Table 3 identifies the sub-modes for each of the four configurations. Bit configuration "00" places all FFs in functional mode and is used for rows that serve to launch transitions into the MUT. Bit configurations "10" and "11" specify the mixed mode described above, where FFs to the left of the insertion point are in preserve-content mode while those to the right are in FD mode. The bit configuration "01" (FD continuation mode) puts all FFs in the REBEL row in FD mode. This allows the delay chain to be extended, which will be necessary in cases where we test multiple regions simultaneously, as is true for the FPU as described below. The outputs from the RCL block 11008 shown in FIG. 12 are annotated to show the values under each of these four bit configurations. Further operational details of the RCL block can be found in C. Lamech, et al. "REBEL and TDC: Two Embedded Test Structures for On-Chip Measurements of Within-Die Path Delay Variations", ICCAD, 2011, pp. 170-177.

| Shift Reg | Functionality |
|---|---|
| 00 | All scan FFs in row are in functional mode |
| 11/10 | Left scan FFs in preserve-content mode, right scan FFs in FD mode referred to as mixed mode |
| 01 | All scan FFs in row are in FD continuation mode |

Figure 13A:
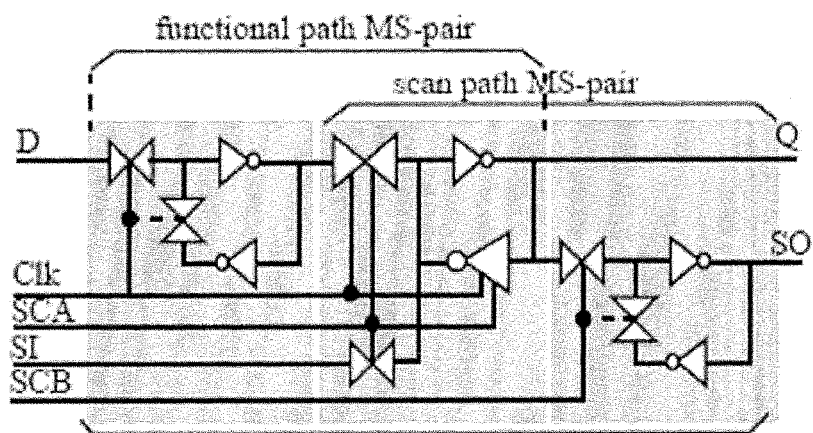
FIG. 13A-13B are schematic diagrams of a circuit that may implement one or more techniques of this disclosure.
Figure 13B:
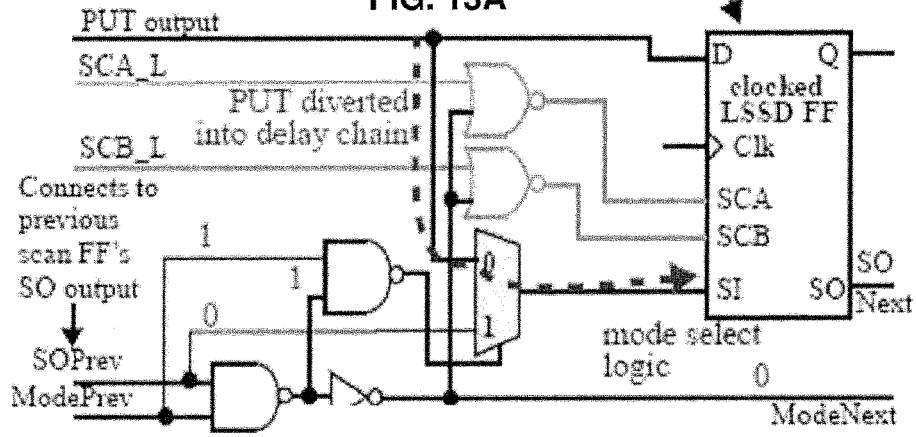

FIG. 13A shows a CLSSD FF used in the FPU macro. As illustrated in FIG. 13A, CLSSD includes three latches. The functional path master-slave (MS) pair shown on the left is driven by Clk. The slave latch is dual ported and also serves as the master in the scan path MS pair on the right. FIG. 13B shows the additional 'front-end' logic for REBEL 11002. As illustrated in FIG. 13B, The functional path's D-input is fanned out to a 2-to-1 MUX, which allows for the insertion of a macro's PUT into the delay chain during the REBEL test. This may be accomplished with the mode select logic shown along the bottom of the figure. In one example, a specific insertion point is selected by pre-loading the row-FFs with a pattern of all '1's followed by a '0' from left to right along the row-FFs (see FIG. 11). C. Lamech, et al. "REBEL and TDC: Two Embedded Test Structures for On-Chip Measurements of Within-Die Path Delay Variations", ICCAD, 2011, pp. 170-177 elaborates on the operational details of the REBEL logic. It should be noted that the front-end logic adds only a small capacitive load to the functional path and therefore the impact of REBEL 11000 on performance is very small. The area overhead of REBEL 11000 within the FPU is 11.45%. All of the HELP bitstring generation components are implemented off-chip in the ASIC experiments. However, in previous work on FPGAs, it was found that the HELP engine area overhead to be approximately 100% of the area occupied by one stage of an Advanced Encryption Standard (AES) implementation, as described above, and overhead is expected to be similar for an ASIC implementation.

Figure 14:
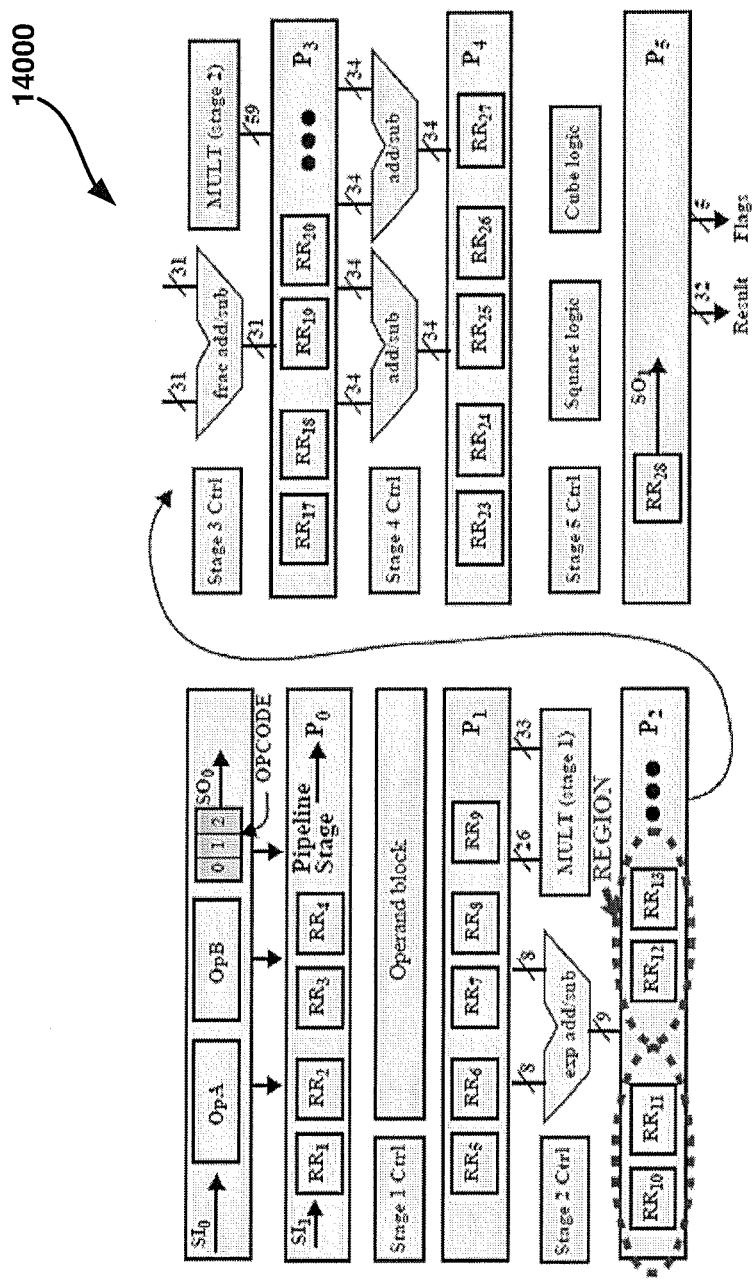
FIG. 14 is block diagram illustrating an example of a floating point unit that may implement one or more techniques of this disclosure.

FIG. 14 is block diagram illustrating an example of a floating point unit that may implement one or more techniques of this disclosure. FIG. 14 shows a block level diagram of a floating point unit (FPU) that may be incorporated on the chips, as well as the inserted REBEL rows, labeled RRx from 1 to 28 in FIG. 14. The design illustrated in FIG. 14 includes 817 FFs, which are wired together into a single scan chain with input $SI_1$ and output $SO_1$. A separate set of 70 shift registers are inserted on the inputs (top-most row of 14000) which serve to enable a launch-off-capture testing strategy for the combinational logic in the first stage of the pipeline.

FPU 14000 is designed as a 5-stage pipeline, labeled $P_1$ through $P_5$, with MUXes, decoders, adder/subtractors, a multiplier, etc. inserted between the pipeline registers. Four separate configurations may be needed to test all the combinational logic between the pipeline stages. Two of the configurations place the FFs in $P_1$ and $P_3$ into functional mode while the FFs in $P_2$ and $P_4$ are configured into the REBEL modes. The other two configurations place FFs in $P_0$, $P_2$ and $P_4$ into functional mode while those in $P_1$, $P_3$ and $P_5$ are configured in the REBEL modes. Within each configuration, pairs of RRs are created to define a set of regions, e.g., see $RR_{10}$-$RR_{11}$ and $RR_{12}$-$RR_{13}$ including in FPU 14000. Within each region, the right-most RR block of the pair, e.g., $RR_{13}$, is configured into FD continuation mode to allow FFs on the right side of the mixed-mode row, e.g., $RR_{12}$, to be used as insertion points with delay chains that extend into $RR_{13}$. Otherwise, the insertion points on the right side of, e.g., $RR_{12}$ would have very small or non-existent delay chains. Each of the four configurations allows up to 8 paths to be timed simultaneously.

In one example, a random testing strategy was applied to FPU 14000, where the values placed in the functional rows are generated by a pseudo-random number generator. For each random pattern, a sequence of configurations are placed into the REBEL rows, each of which changes the position of the insertion point incrementally from left-to-right across each of the mixed-mode rows. This is necessary because, in one example, REBEL 11000 allows only one path output per region to be timed during each test. Therefore, in order to test all PUT outputs that connect as inputs to a REBEL mixed-mode row, a sequence of tests are applied using the same random input pattern but with a different insertion point.

Figure 15:
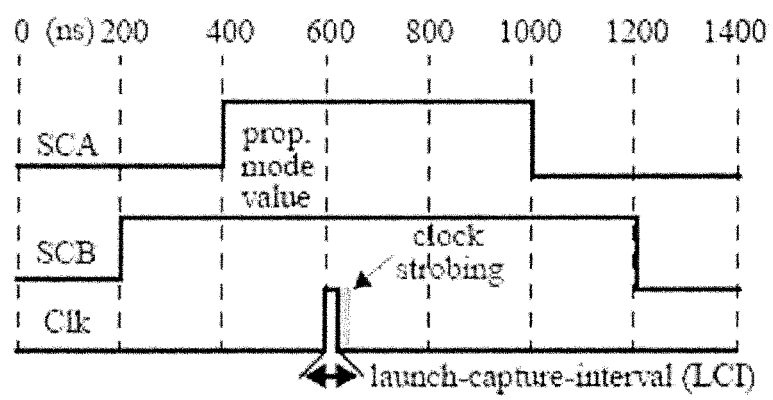
FIG. 15 is an example timing diagram illustrating one or more techniques of this disclosure.

The timing relationship of several control signals and the launch-capture interval (LCI) are illustrated in FIG. 15. Prior to the LCI test, the SCA and SCB signals are asserted, which effectively activates the delay chains in the REBEL rows. The LCI test is defined by asserting and de-asserting the Clk signal, which launches transitions in the combinational logic. De-assertion halts all signals propagating along the delay chains and creates the digital snapshots. The resolution of the measured delays is limited by the delay through each of the master-slave FFs that implement the delay chain. This delay is typically larger than the desired resolution, e.g., in example chips, it is approx. 500 ps. A technique called clock strobing may be employed to increase the resolution. Clock strobing involves repeating the test sequence at incrementally longer LCIs. In one example, the launch-capture clock sequence is generated using a digital clock manager (DCM) on a Xilinx Zynq FPGA. The fine phase adjust (FPA) feature on the DCM allows the LCI to be set with a resolution of 17.857 ps. A specific FPA may be configured into the DCM by a state machine running on the FPGA which accepts an integer input parameter from a controlling C application. Valid values of the FPA may be between 0 and 1120, which corresponds to a programmed LCI between 0 and 20.000 ns. The pulse-creation logic within the FPGA as well as the response characteristics of the FPGA pads prevents clock pulses narrower than approximately 2 ns from being produced on the clock output pin of the FPGA. In the conducted experiments, a sequence of LCI tests over the range of FPAs between 120 to 681 in FPA increments of three was applied. This resulted in the application of (681−120)/3+1=188 LCI tests with a Δt of 53.6 ps between consecutive LCIs.

Figure 16:
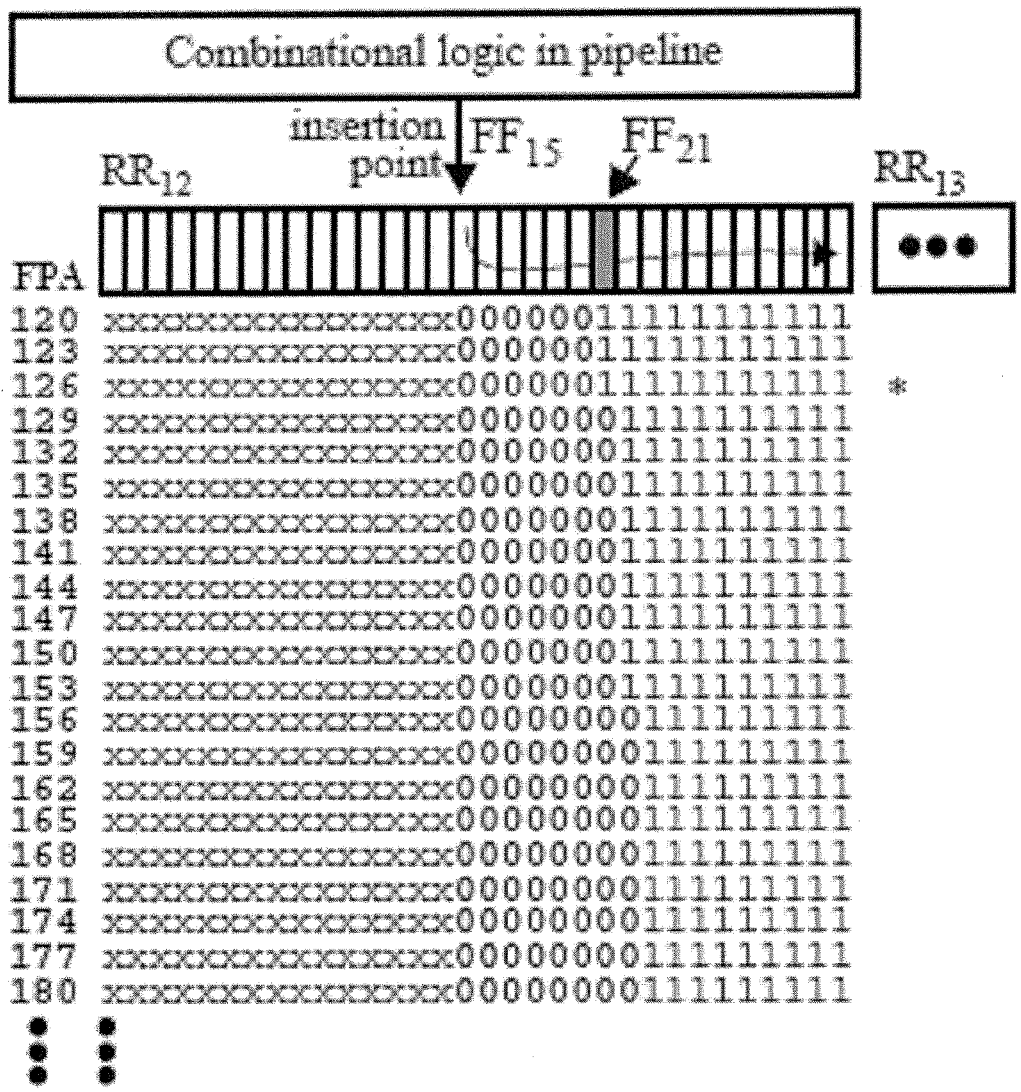
FIG. 16 is a conceptual diagram illustrating digital snapshots according to one or more techniques of this disclosure.

The raw data captured in the delay chain is a string of binary bits, one string for each of the 188 LCI tests applied to test a path. It should be noted that paths with no transitions were only tested with the first LCI and further testing was aborted to save time. FIG. 16 shows the digital snapshots for the first 21 LCI tests of a path in a vertical sequence. The insertion point in this example is $FF_{15}$ of the mixed-mode row $RR_{12}$ from FIG. 14. The programmed FPA for each snapshot is displayed on the left side of FIG. 16. The first FPA (120) shows a sequence of six 0's in the left portion of the snapshot. This indicates that a falling edge propagated along six elements of delay chain, i.e., through $FF_{15}$ through $FF_{20}$, before being halted by the capture event. In each subsequent snapshot up through FPA 126, the edge continues to propagate through $FF_{20}$ but fails to reach $FF_{21}$, until FPA 129 is applied. The falling edge requires nine more FPAs, i.e., 129 through 153, to propagate completely through $FF_{21}$.

Example bitstring generation algorithms described below use timing information from paths that are deemed "stable." In one example, a stable path requires that all digital snapshots contain exactly one transition, with the edge proceeding in an orderly fashion from one delay chain FF to the next. It should be noted that the testing of paths that glitch, i.e., those that produce more than one transition, is immediately aborted. The subset of digital snapshots obtained for the path shown in FIG. 16 qualifies the path as stable (assuming the remaining snapshots exhibit similar behavior).

Figure 17:
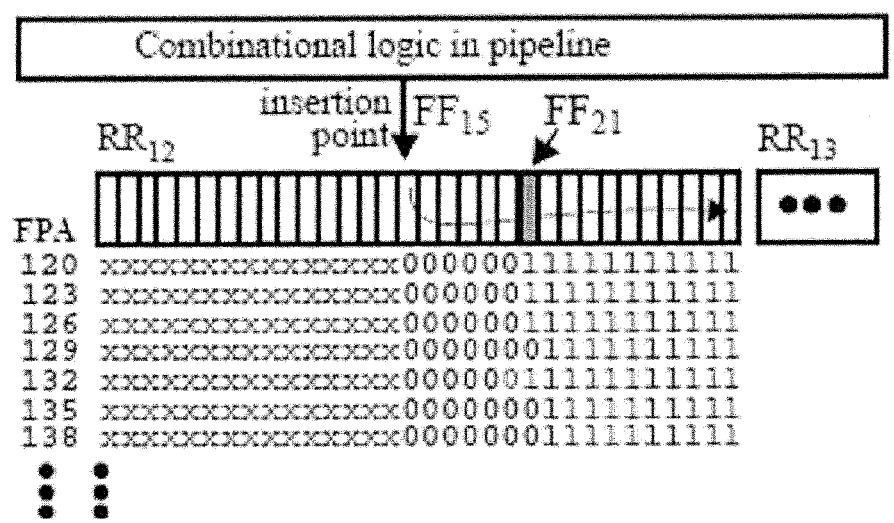
FIG. 17 is a conceptual diagram illustrating digital snapshots according to one or more techniques of this disclosure.

In contrast to FIG. 16, FIG. 17 shows a sequence of snapshots that exhibits 'wobble' where the '0' reverts back to $FF_{20}$ at FPA 132 after progressing to $FF_{21}$ at FPA 129. It was found that including paths that exhibit wobble, particularly those that wobble multiple times in the sequence of snapshots, are more likely to exhibit glitchy behavior at other TV corners. The timing associated with paths that glitch, in turn, can vary significantly and introduce bit flips. HELP also classifies paths as unstable if the range of FPAs obtained from multiple samples is larger than a threshold or if the number of replicated snapshots for each FF is below a threshold, i.e., the transition propagated too quickly through a FF. All of these criteria together significantly improve the ability of HELP to identify paths that are stable at enrollment and remain stable at other TV corners. Doing so is critically important to reducing the number of bit flips caused by jumps, which are discussed below.

A user-defined target FF may be used to determine which FPA is selected as the timing for the path. The target FF is the FF at a fixed position from the insertion point, for example, if the target FF is six than $FF_{21}$ in FIG. 16 is the target FF for the insertion point at $FF_{15}$. The algorithm that was used to determine the timing for a path collects and parses the snapshots in reverse order, i.e., starting with the snapshot produced under the longest LCI and progressing to shorter LCIs. The search for the FPA that represents the timing ends when the transition value for the path, which is '0' for the snapshots in FIG. 16, is 'pushed back' to the FF to the immediate left of the target FF ($FF_{20}$ in FIG. 16). This happens at FPA 126 and represents the FPA where the propagating 1-to-0 transition is just about to enter the target FF.

The only remaining issue for path selection is dealing with paths that are timed by more than one test vector. It was found that approximately 40% of the paths that are found to be stable in the FPU macro are timed more than once. This occurs because the random sequence of tests applied to the macro provide no guarantee that each test pattern sequence tests only unique paths. Fortunately, it is relatively easy to identify re-tested paths. One example algorithm stores the FPAs and insertion points for stable paths in a memory, which is searched when a new path is tested and found stable. If a match to the FPA and insertion point is found, the path is discarded. The match criteria to the FPA includes a small tolerance to account for measurement noise.

For one set of test chips, 38 random vectors were applied to the FPU in 50 copies of the test chip and tested a total of 31,236 paths using the four configurations described above. The average number of stable paths per chip is approximately 2,700, which represents approximately 8.6% of all paths tested. The FPA timing value that was obtained for these stable paths is referred to as PUF Numbers or PNs. The PNs are distilled from the FPAs described above using the formula given by Equation 1. Therefore, the range of FPAs from 120 to 681, in steps of size 3 translates into PNs from 0 to 187 in steps of size 1. The actual delays associated with PN=0 is 2.143 ns and PN=187 is 12.161 ns.

$$PN = \frac{(FPA - 120)}{3} \quad \text{Equation 1}$$

The bitstrings produced from bitstring generation algorithms were evaluated using the standard statistical criteria that has emerged for judging the quality of a PUF. Inter-chip hamming distance (HD) is used to determine the uniqueness of the bitstrings among the population of chips. Inter-chip HD computes the average number of bits that are different across all pairings of chip bitstrings and expresses the average as a percentage. As described above, best possible result is 50%, i.e., on average, half of the bits in the bitstrings of any two arbitrary chips are different. The NIST statistical test suite was used to evaluate the randomness of the bitstrings produced by each chip. In general, the NIST tests look for patterns in the bit strings that are not likely to be found at all or above a given frequency in a 'truly random' bitstring. For example, long or short strings of 0's and 1's, or specific patterns repeated in many places in the bit string work against randomness. The output of the NIST statistical evaluation engine is the number of chips that pass the null hypothesis for a given test. The null hypothesis is specified as the condition in which the bitstring-under-test is random. Therefore, a good result is obtained when the number of chips that pass the null hypothesis is large. Third, Intra-chip HD was used to evaluate stability of the bitstrings, i.e., the ability of each chip to reproduce the same bitstring time-after-time, under varying temperature and voltage conditions. It was carried out on the bitstrings produced by each chip across the 9 TV corners. Ideally, all nine bitstrings are identical and the Intra-chip HD is 0%. An average Intra-chip HD is computed using the individual chip results. In addition to these statistical tests, other security related metrics were evaluated, as appropriate, including, for example, how difficult it is for an adversary to reverse engineer the bitstring and/or to model build the PUF.

The delay distributions for $CHIP_1$ for each of the TV corners are shown in FIGS. 18A-18B. The PNs are obtained with the target FF set to 8. The PN number (delay) is plotted along the x-axis against the number of instances on the y-axis. The graph in FIG. 18A superimposes the distributions obtained when the supply voltage (VDD) is set to 1.20V (nominal) and the temperature is set to each of 25° C., −40° C. and 85° C., while the graph in FIG. 18B superimposes the distributions at these temperatures, but with $V_{DD}$ set to +/−10 of nominal. It is clear that supply voltage has a larger impact on delay than temperature. Both the graphs in FIG. 18A-18B show that the path distribution is skewed, with larger numbers of shorts paths than longer paths.

Although not shown, the distributions from other chips are similar in shape, but vary in width and position along the x-axis, which is caused by chip-to-chip process variations. More importantly, the ordering of the tested paths in each chip's distribution is unique and is determined primarily by within-die process variations, which is an important source of entropy for HELP. Two of the bitstring generation techniques described below generate and then extract information from the delay distribution at 1.20V, 25° C. (called the enrollment distribution) as a means of improving the robustness of the bitstring regeneration process.

As mentioned in above, the entropy source for HELP is defined from two components; path stability and within-die variations in delay. This dual source of entropy is a significant benefit to improving the randomness of the generated bitstrings, as well as increasing the difficulty of reverse engineering attacks. In an FPGA implementation of the Advanced Encryption Standard (AES) as the core macro, it was found that both sources of entropy provided a high degree of randomness in the generated bitstrings. Several bitstring generation methods may be used with the FPGA implementation of the AES, including one of which leverages only the path stability entropy source, which is referred to herein as Universal, No Modulus or UNM.

Figure 19:
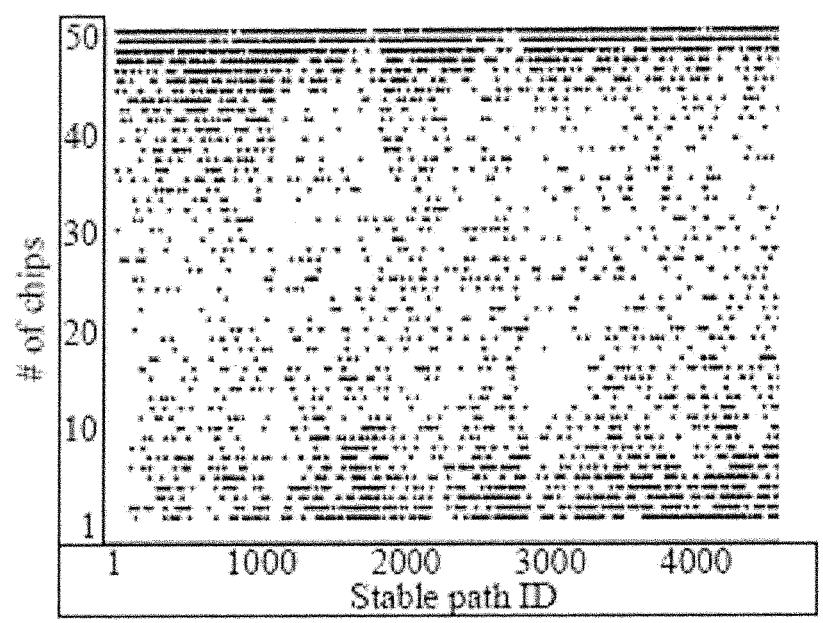
FIG. 19 is an example graph illustrating one or more techniques of this disclosure.

Although UNM performed well in the AES implementation as described above, in some cases it does poorly when applied to the data from the FPU. In particular, in one example, the computed inter-chip hamming distance is only 38%. The reason it does poorly is shown in FIG. 19. The x-axis in the graph illustrated in FIG. 19 assigns a path ID (PID), from 1 to 4650, to each path that is identified as stable in at least one chip while the y-axis gives the number of chips that each PID is found to be stable in. Therefore, path IDs with a value of 1 are unique to one chip and are not found to be stable in any other chip. Conversely, path IDs with a value of 50 are stable in every chip. The top portion of the graph illustrated in FIG. 19, and in particular the top line, is densely populated with points, and indicates that there is a high-level of commonality in a large fraction of the stable paths. As is shown below, the dependency of the UNM technique on requiring the opposite condition, that a large number of the stable paths for a given chip do not occur in every chip, causes it to score poorly on the uniqueness criteria.

Figure 20A:
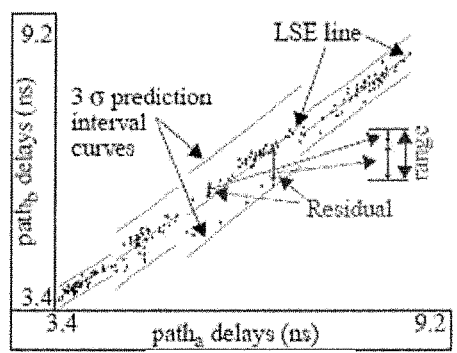
FIG. 20A-20B are example graphs illustrating one or more techniques of this disclosure.
Figure 20B:
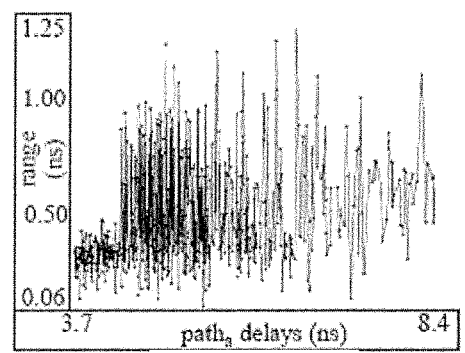

On the other hand, the level of within-die variations within the FPU are sufficient to enable the generation of high quality bitstrings using bitstring generation techniques that are designed to leverage them. These techniques are referred to as 'Universal, No Modulus, Difference' or UNMD and 'Dual-PN Count' or DPNC. The graphs illustrated in FIGS. 20A-20B illustrate an example process used to quantitate the level of within-die variations across a set of chips. The process may be referred to as regression analysis. Linear regression is applied to scatter plots which are constructed using the delays from pairings of paths across the chips. FIG. 20A depicts the scatterplots for 4 path pairings. Paths were selected that are stable in all 50 chips as a means of capturing the full extent of within-die variations in our sample, i.e., PIDs from the top line of FIG. 19 were used. Linear regression analysis first computes a least squares estimate (LSE) of a best fit line through the data points of each scatter plot. Several of the LSE lines are labeled in FIG. 10A. The LSE line tracks chip-to-chip process variations.

Within-die variations (and random noise) are represented by the vertical offsets of the data points from the LSE line. The vertical offsets are called residuals (several are labeled in the FIG. 10A). The range of the residuals was computed in each scatterplot, which is given by the sum of the distances from the regression line of the most negative and positive data points, as illustrated in FIG. 10A. FIG. 10B plots the within-die variation results for the 716 path pairings that are stable in all chips. The average delay of the first path ($path_a$) is plotted along the x-axis against the range of the residuals along the y-axis. Within-die variation varies from approximately 60 ps to almost 1.25 ns. This information is used to tune parameters of the bitstring generation techniques described below.

As described above, the terms enrollment and regeneration are used in reference to bitstring generation processes associated with PUFs. Enrollment is carried out when a new bitstring is required, while regeneration refers to the process of reproducing the bitstring. The application determines whether exact reproduction is required, e.g., encryption requires exact reproduction while authentication typically does not. However, for any application, the closer the regenerated bitstring is to the enrollment bitstring, the better. The main challenge associated with reproducing the bitstring exactly is dealing with measurement and TV noise. These noise sources change the measured values of the entropy source, possibly causing bits in the bitstring to flip or change value from '0' to '1' and vise versa.

Error correction is commonly used to fix errors in regenerated bitstrings in cases where exact reproduction is needed, e.g., encryption. One approach uses thresholding to avoid errors and redundancy to fix errors introduced by random measurement noise (techniques that are described in detail below). A calibration technique, called Temperature/Voltage Compensation or TVCOMP, may be applied to deal with TV noise. The principle behind TVCOMP is to derive scaling constants during enrollment and regeneration that allow a linear transformation to be applied to the PNs obtained during regeneration. The linear transformation shifts and scales the regenerated PN distribution and makes it similar to the distribution obtained during enrollment. Calibration is carried out by computing a mean PN and a PN range during enrollment which are recorded as Helper Data. Helper Data is stored in a non-volatile location for use during regeneration. During regeneration, the mean and range are again computed and the PNs are transformed as given by Equation 2. The transformation works well to compensate for non-random changes in the PNs such as those introduced by TV noise.

$$PNTVCOMP = (PNregen - \text{mean}(R)) \times \frac{\text{range}(E)}{\text{range}(R)} - \text{mean}(E) \quad \text{Equation 2}$$

As described above, besides measurement and TV noise, HELP has an additional source of noise called jumps. Jumps are dramatic changes in the PN values of certain paths when the TV conditions change. The underlying cause for the jump behavior is the appearance and disappearance of 'hazards' on off-path inputs of gates which are components of the tested path. Under some TV conditions, it is possible that an off-path input, which normally remains at its non-dominant value, e.g., a '1' on an input to an AND gate, changes momentarily to a dominant value. Depending on the relative timing between the appearance of the hazard and the actual signal transition along the tested path, it is further possible that the actual signal transition is momentarily delayed by the hazard. When this occurs, a fundamental change occurs in the path delay. Unfortunately, there is no way to predict which path delays will be effected by jumps.

Redundancy techniques that are effective in dealing with this problem are described below.

In some examples, HELP may make use of thresholding and spatial redundancy techniques as a means of allowing the user to trade-off reliability with bitstring generation time and Helper Data size for applications that require exact regeneration of the bitstring. The term spatial refers to the multiple, redundant copies of the bitstring that are produced across different regions of the entropy space. FIG. 21A illustrates one form of thresholding that may be used, called difference thresholding, and the spatial redundancy technique. Difference thresholding may be used in the UNMD bitstring generation technique. The illustration in FIG. 21A portrays the sequence of operations that are performed to generate a bitstring and the corresponding set of Helper Data that is produced during enrollment.

Figure 18:
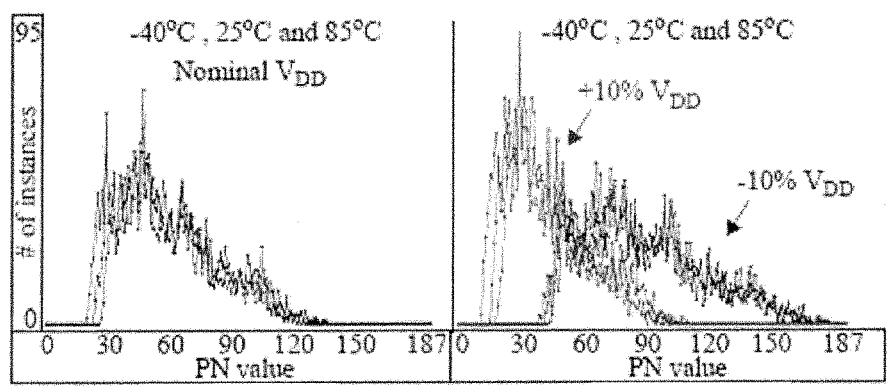
FIG. 18A-18B are example graphs illustrating one or more techniques of this disclosure.

First, TV noise thresholds labeled +Tr and −Tr in FIG. 11A are derived from the width of the delay distribution profile for the chip, similar to the one shown for enrollment in FIG. 18. It was found that making the threshold dependent on the chip's distribution profile works well in keeping the size of the bitstrings across all chips approximately equal. A bit is generated under difference thresholding by computing the signed difference between a pairing of PNs, and then comparing the magnitude of the difference with the +Tr and −Tr thresholds. If the difference falls within the +Tr and −Tr region, the PN pairing is considered invalid and is not allowed to generate a bit. When this occurs, the Helper Data, labeled as valid bitstring in the FIG. 21A, is updated with a '0' as a means of instructing subsequent regeneration processes that this PN pairing is to be skipped. In contrast, the term strong bit is used to refer to cases where the PN difference falls above +Tr or below −Tr. In this case, the sign of the difference is used to generate the secret bit and the valid bitstring is updated with a '1'.

A set of example PN differences are plotted along the x-axis in FIG. 21A against their differences along the y-axis. The left-most 6 PN pairings shows the process of generating a secret bitstring of length 4. The remaining sequence of PN pairings illustrate the process associated with spatial redundancy, in particular, a redundancy scheme that uses 3 copies of the bitstring (the spatial redundancy scheme extends to any odd number of copies). The left-most bitstring labeled Secret BS is generated from the first 4 strong bits encountered in the PN pairing sequence as discussed above. The second bitstring labeled Redundant $BS_1$ is produced from the next sequence of PN pairings, but has the additional constraint that each of its bits must match those in the first bitstring. During its construction, it may happen in the left-to-right parsing of the PN pairings that a strong bit is encountered that does not match the corresponding position in the Secret BS. In the example, this occurs at the position indicated by the left-most bold '0' in the valid bitstring. Here, a strong bit was encountered with a value of '0'. But the Secret BS requires the first bit to be a '1', so this strong bit is skipped. This process continues until redundant bitstrings $BS_1$ and $BS_2$ bitstrings are constructed.

The number of strong bits required to generate a secret bitstring of length 4 is approximately 5× or 20. From the example, this is evaluated by counting the number of '1's and bolded '0's in the valid bitstring, which is given as 19. The benefit of creating these redundant bitstrings is the improved tolerance that they provide to bit flips. For example, during regeneration, the three bitstrings are again produced, but this time using the valid bitstring to determine which PN pairings to consider. In cases where a jump occurs, it is possible that the difference from a PN pairing for a strong bit becomes displaced from the strong bit region across the '0' line in FIG. 21A. The change in the sign of the difference would normally introduce a bit flip. However, with spatial redundancy, a bit flip can be avoided if no more than 1 bit flip occurs in a single column of the matrix of bits created from the 3 bitstrings. For example, the first 3 rows of the matrix of bits in FIG. 21B are constructed during regeneration in a similar way to those shown in FIG. 21A for enrollment. The bottom row represents the final secret bitstring and is constructed by using a majority vote scheme. The bit flip shown in the third column has no effect on the final bitstring because the other two bits in that column are '1', and under the rule of majority voting, the final secret bit is therefore defined as '1'.

As described above, 31,236 paths were tested on each chip and 8.6%, i.e., 2,700 paths on average, were found to pass stability criteria per chip. The statistical analysis requires the number of bits to be equal in the bitstrings of all chips so the number of PNs was reduced to the smallest number produced by one a chips, which was 2,519. The actual bitstring size is dependent on the number of PNs, the level of redundancy and on the bitstring generation method, as described in the below.

The UNM technique is the simplest of the 3 methods from an implementation point of view, and also produces the smallest amount of Helper Data. Unfortunately, it is also the easiest to reverse engineer and, as we discussed above, the statistical quality of the generated bitstrings is dependent on the macro-under-test. The enrollment distribution (25° C., 1.20V) in FIG. 22A is annotated to illustrate components of the analysis of the UNM bitstring generation algorithm. A region in the center of the distribution labeled UNM margin identifies PNs that are excluded from the bitstring generation process. In contrast, the region below the left-most threshold labeled low bin and the region above the right-most threshold labeled high bin identify PNs that are valid. An example algorithm may create this distribution and sweep the two thresholds from left to right across the distribution in discrete steps, while maintaining the UNM margin between them. At each step, the number of elements in the low and high bins are counted. The position where the number of PNs in each bin is closest to being equal is saved and used in the bitstring generation process. The goal to equalize the cardinality of the two bins maximizes the chance that the generated bitstrings will have equal numbers of '0' and '1's, which is an important statistical quality metric.

The distance between the vertical thresholds is fixed at a value that ensures that changes in any of the PN values at different TV corners do not exceed half of this margin. Experimental results show that jumps are the worst case condition to deal with and these force the UNM margin to be set to approx. 3.8 ns (this margin is sufficient to prevent bit flips from occurring in any of the chips). During regeneration, the positions of the thresholds are again determined but, in this case, the midpoint between them is used to decide whether a given PN is in the low or high bin as shown in FIG. 12B. The Helper Data is consulted to ensure the same PNs used in the bitstring generation process carried out during enrollment are used here during regeneration. The value of these PNs in the regeneration data is likely to be different than their value during enrollment because of TV noise. As long as none move from their original bin across the midpoint line to the other bin, then no bit flips occur.

In an example of UNM, the bitstring may be generated by pseudo-randomly selecting pairs of PNs from the low and high bins to compare. A linear-feedback-shift-register or LFSR implemented with a primitive polynomial may be used to generate the pseudo-random pairings as a means of ensuring that all possible pairings can be generated. As an example, if the sum of cardinalities of the two bins is 1,000, then it is possible to generate up to 1,000*999/2=499,500 bits. An XOR-style of comparison if used to generate each bit, i.e., if both PNs being compared are in the low or both are in the high bin, then a '0' is generated, otherwise a '1'. It is recognized that re-using each of the n PNs in n−1 comparisons (all combinations) subjects the PUF to model-building attacks for applications such as authentication, which, by definition, reveal the responses to the external world. In this disclosure all combinations are only as a means of providing a more significant sample to the evaluation processes designed to determine statistical quality.

From this algorithm, it is clear that the bitstring for one chip would be different from the bitstring for another chip if a significant number of the PNs for each chip are associated with distinct path IDs (PIDs). Given the wide margin between the low and high bins, within-die variations in path delays cannot effect the outcome of the bitstring generation process. In other words, if two chips select the same set of stable paths, the LFSR will select PNs in the same order and produce the same bitstring for both chips because within-die variations are not large enough to move PIDs from the low bin to the high bin and vise versa in different instances of the chips. Therefore, UNM depends entirely on the randomness of path stability. As indicated above, the inter-chip HD for UNM is only 38%, which is considerably lower than the ideal of 50%. Therefore, when using the FPU as the macro-under-test, the entropy content associated with path stability is not sufficient to produce a quality PUF.

The partitioning of the distribution into low and high bins in combination with the public Helper Data, that identifies which paths are stable and participate in bitstring generation on each chip, increases the ease of carrying out reverse engineering attacks on UNM. If the seed and LFSR are known, then an adversary can simulate the tested paths to determine whether the PN is in the low or high bin for a given chip, thereby enabling the secret bitstring to be reconstructed. Obscuring the Helper Data prevents this attack but is difficult to implement. The UNMD and DPNC bitstring generation techniques described below leverage both path stability and within-die variations, making this type of attack more difficult or impossible to carry out.

The Helper Data for UNM is a path bitstring with one bit allocated for each tested path. If a path is stable and the PN falls in either of the low or high bins, then a '1' is recorded, otherwise a '0'. The size of the path bitstring is related to the fraction of stable PNs and the UNM margin. For example, 8.5% of the paths are indicated as stable, so a bitstring of length 256 would require approximately 6 Kbits of Helper Data, computed as 256/0.085*2. The factor of 2 assumes that the thresholding preserves half of the distribution in the sum of cardinalities of the 2 bins.

UNMD may use a difference thresholding technique than the UNM thresholding technique described above. Therefore, the PNs that are valid for comparisons can appear anywhere in the distribution shown in FIG. 22A, not just in the tails. More importantly, both path stability and within-die variations play a key role in deciding which comparisons generate secret bits. This seemingly small change adds significantly to the entropy of the system and dramatically improves the randomness and uniqueness quality metrics of the secret bitstring.

One potential drawback of UNMD over UNM is in the size of the public Helper Data. In some examples, both techniques require a path bitstring that records which paths are stable in the sequence of applied random tests during enrollment. However, UNM can then update the path bitstring to exclude stable paths with PNs that are not in the tails of the distribution shown in FIG. 22A, while UNMD requires a second public data bitstring, called the valid bitstring, to record the thresholding result as discussed above. The size of the valid bitstring for UNMD is dependent on the difference threshold and the level of spatial redundancy, e.g., 3, 5, 7, etc.

Difference thresholding was described above with reference to FIG. 21. Within-die variations can change the sign of the PN differences in different chips, thereby adding entropy to the bitstrings. However, this only occurs when the two paths of a pairing have delays that are within the range of within-die variation. Above, regression analysis was used to determine that within-die process variations introduce delay variations of less than approximately 1.25 ns, which is a range from 0 to 23 PNs (53.6 ps/PN*23 PNs~1.25 ns). Therefore, path pairing which produce PN differences that are larger than 23 PNs are likely to have the same sign, and corresponding bit value, across chips, which, in turn, acts to reduce the entropy in HELP.

Figure 23:
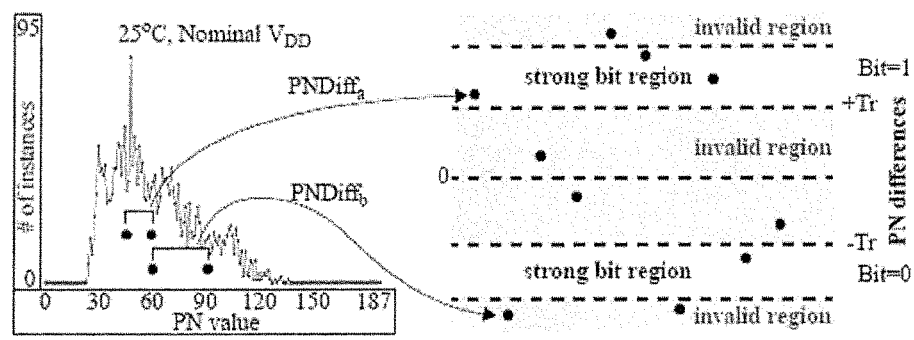
FIG. 23 is a conceptual diagram illustrating one or more techniques of this disclosure.

A modification to difference thresholding, called modulo thresholding, addresses this problem. The scheme is illustrated in FIG. 23. The enrollment distribution from FIG. 22 is annotated in FIG. 23 with PN data points from 2 path pairing and their corresponding PN differences labeled $PNDiff_a$ and $PNDiff_b$. While $PNDiff_a$ is within the range of within-die variation, i.e., has value of 15, $PNDiff_b$ is larger with a value of 30. Therefore, the bit value derived from $PNDiff_b$, in cases where this pairing is identified as stable, is likely to remain the same in these chips, and will adversely impact inter-chip HD. Modulo thresholding adds two more thresholds to create stripes in which strong bits are required to fall as shown in the right side of FIG. 23. Striping ensures that the delay difference between 2 paths of an arbitrary pairing does not exceed the within-die variation levels. It was found that a stripe height between 10 and 15 is effective at filtering out these biased path pairings.

In conducted experiments, a variety of TV noise thresholds between 0 and 15 were experimented with as a means of evaluating the best choices for stripe height and spatial redundancy. It was required that 1) no bit flips occurred for any chip at any TV corner, i.e., the intra-chip HD is 0%, 2) the inter-chip HD is close to the ideal of 50% and 3) the bitstrings score well on the NIST statistical tests. It was found that these conditions could be met using any one of several different combinations of the TV noise threshold, stripe height and spatial redundancy parameter values. Moreover, it was found that the size of the bitstrings produced by the chips remained relatively constant under each of the parameter combinations that met the three requirements above. In particular, bitstring size varied between 55 K and 65 K bits. This yields an overhead per bit of approximately 50, i.e., 50 path pairings need to be parsed for every valid bit generated. As described above, this valid bitstring overhead adds to the path bitstring overhead. So the Helper Data for a 256-bit bitstring would be approximately 3 Kbits (assumes 8.5% of the paths are stable)+13 Kbits (256*50)=16 Kbits or 2.0 KBytes. Another interesting result is that at a spatial redundancy setting of 17, the threshold 0 was made and 3 requirements were met.

Figure 24:
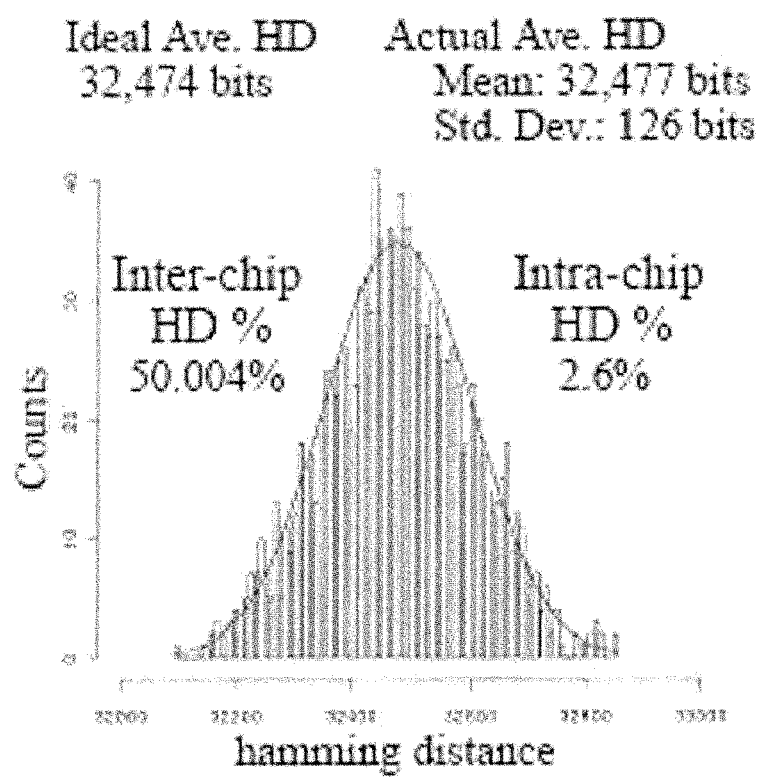
FIG. 24 is an example graph illustrating one or more techniques of this disclosure.

FIG. 24 gives the inter-chip hamming distance (HD) distribution for UNMD. The individual HDs are computed pair-wise using the bitstrings of length 64,948 bits from 50 chips, yielding 1,225 HDs. The ideal (50%) average HD value is 32,474 bits. The value computed is 32,478, which expressed as a percentage is 50.004%. The TV noise threshold was set such that no bit flips occurred in any of the 50 chips at any of the 8 regeneration TV corners, so the intra-chip HD is 0%. However, with thresholding turned off, the actual underlying intra-chip HD is computed to be 2.6%. The size of the bitstrings before thresholding is 3,171,421. The average number of bits that survive the thresholding is approximately 2.5% (the bitstrings used for FIG. 14 are only 2% because the bitstrings for all chips were truncated to the smallest bitstring produced by one of the chips). These bitstrings were also subjected to the NIST statistical test suite using the default level of significance, i.e., $\alpha=0.01$. The bitstrings passed the all tests applicable to bitstrings of this size, including frequency, block frequency, cumulative sums, runs, longest run, rank, FFT, nonoverlapping template, approximate entropy and serial.

A third technique called the DPNC provides several trade-offs when compared to UNM and UNMD techniques. DPNC is the most expensive technique in terms of Helper Data bits required per secret bit, but is likely to be the most secure with respect to reverse-engineering attacks. The large number of Helper Data bits effectively restricts the size of the secret bitstring to 256 bits or smaller from a practical perspective.

Figure 25:
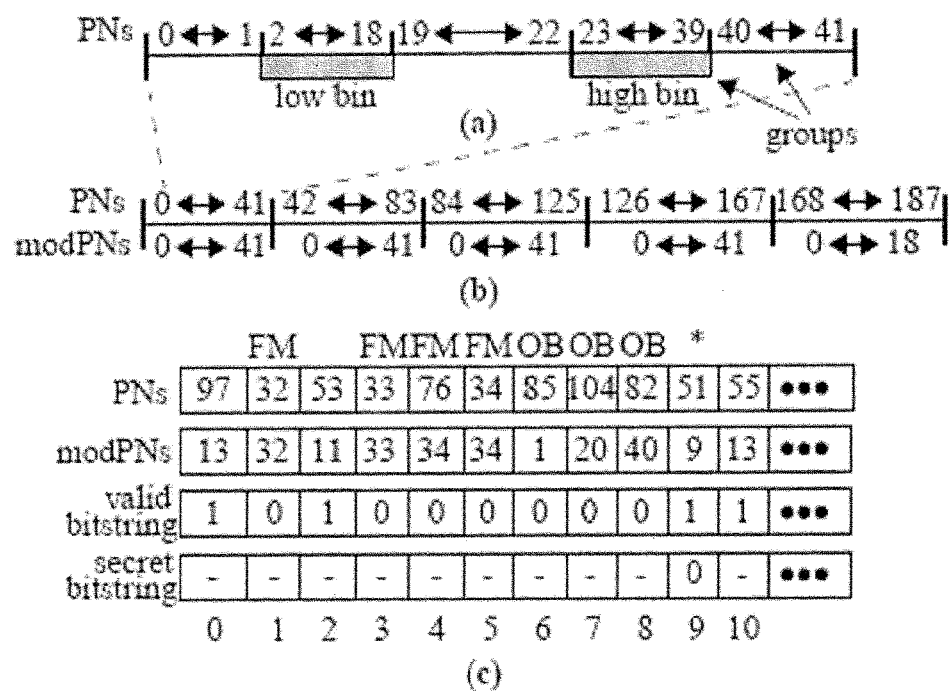
FIG. 25 is a conceptual diagram illustrating one or more techniques of this disclosure.

The illustration in FIG. 25 shows the basic concepts of the DPNC technique. It should be noted that the implementation DPNC described with respect to FIG. 25 may be more efficient in terms of entropy extraction that DPNC implementations described in Aarestad et al. "HELP: A Hardware-Embedded Delay-Based PUF," IEEE Design and Test of Computers, Vol. 30, Issue: 2, March, 2013. pp. 17-25 and that described above. Portion (a) of FIG. 25 shows the binning process used by DPNC. A segment of the range of PNs between 0 and 41 are listed along the top and are partitioned into 5 groups. The PNs in the groups labeled 'low bin' and 'high bin' represent valid PNs. PNs in the remaining 3 regions are invalid and are discarded when they appear in the sequence. These regions represent a safety margin between the low and high bins and account for uncompensated shifts in the PNs that occur during regeneration because of TV noise. As described above, consecutive PNs represent a difference in path delay of approximately 53.5 ps so the entire span from 0 to 41 represents approximately 2.2 ns of delay variation. The difference between the two valid bins, however, is between 0.27 and 1.12 ns (in PNs, between 5 and 21), which is within the within-die variation range from FIG. 20. Portion (b) of FIG. 25 shows the modulus operation. Using a modulus of 42 causes PNs larger than 41 to wrap back around into the 0 to 41 region. This effectively maps the delays of longer paths into the short path region, while preserving the within-die variations in these longer paths.

Portion (c) of FIG. 25 shows the DPNC method applied to an example sequence of PNs during enrollment. DPNC requires and odd number of copies, 1, 3, 5, 7, etc. copies of low bin or high bin PN to be found in the sequence before actually generating a secret bit. Similar to spatial redundancy, this scheme adds resiliency to bit flip errors which can occur when PNs move into the opposite bin during regeneration because of TV noise or jumps. The bin of the first valid PN in the sequence determines which bit value, '0' or '1', will be generated. For example, the modPN given in column 1 in portion (c) of FIG. 25 is 13 and is therefore valid and in the low bin so the algorithm searches for two more copies of valid modPNs that also fall in the low bin. The modPN in column 2 is valid, but falls in the high bin according to portion (a) of FIG. 25 and therefore is marked invalid and skipped (header given as 'FM' means 'failed to match'). The modPN in column 3 is 11, a valid low bin value and therefore represents the second copy. Columns 4, 5 and 6 are valid, but fail to match. Columns 7, 8 and 9 fall in the safety regions of in portion (a) FIG. 25 and are marked invalid (header given as 'OB' means 'outside the bins'). Column 10 contains a valid low bin PN and represents the third copy. Therefore, a secret bit with value 0 is generated as shown along the bottom of FIG. 25. Regeneration is carried out by reading the valid bitstring to determine which PNs to inspect. Two counters count the number of low bin and high bin values and a bit is generated based on majority vote every time an odd number of valid PNs are parsed.

The DPNC techniques was applied to chip data using the parameters given in the example, i.e., modulus of 42 and a bin width of 16, but increased the redundancy from 3 to 7 as a means of meeting the 3 requirements mentioned for UNMD, namely, 1) no bit flips, 2) near 50% inter-chip HD and 3) good NIST results. The average size of the secret bitstrings was 157 bits. The smallest size used in the following statistical results was 148 bits. Intra-chip HD was 0%, inter-chip HD was 49.96% and the bitstrings passed all applicable NIST tests including frequency, block frequency, cumulative sums, runs, longest run and serial. The public data size for DPNC was 31,236 bits, of which 2,519 stable PNs were obtained and bitstrings of length 157 on average could be generated. Therefore, approximately 200 paths must be tested to generate each secret bit under DPNC. A bitstring of size 256 requires 51 Kbits or 6.4 KBytes. Clearly, DPNC is the most expensive technique with respect to Helper Data. However, the modulus operation makes a simulation-based attack, as is described above with respect to UNM, useless because only the high frequency behavior of the path delays are preserved in the modPNs.

As described above, in addition to the HELP PUF, another type of PUF is the arbiter (ARB) PUF, which may derive its entropy from variations that occur in the delays of identically configured logic paths. The Arbiter PUF is designed to leverage delay variations that occur in identically configured paths. Typically, in order to avoid biases, the paths that are timed are implemented in a specialized test structure which allows the gate-level components that define the paths to be 'swapped.' A digital challenge controls the specific configuration of the swapped and unswapped gate-level components using 2-to-1 multiplexors. A phase detector is inserted at the endpoints of the test structure to determine the relative delay of the two paths-under-test. The relationship is binary, i.e., either the first path is faster than the second or vise versa, and therefore can be represented as a 0 or 1 response bit. The sequences of response bits produced by a sequence of challenges defines the bitstring.

This type of binary response evaluation circuit does not contain any hint as to how different the delays for a given pair of paths are. This disclosure investigates a supporting test structure for obtaining 'soft' information from the ARB PUF, that is designed to measure the delay of the actual paths. The example time-to-digital converter (TDC) described herein produces a digital value in the range of 0 to 120 that is proportional to this delay. Additional benefits of the TDC over, for example, ring-oscillator variants of the ARB PUF, include; 1) the ability to self-compensate for variations in ARB PUF delays that are introduced by changes in temperature and voltage, 2) the ability to provide very fast data collection times, e.g., single-shot measurements times are less than 20 ns/sample, and 3) the ability to tune resolution down to sub-gate-delay levels.

In one example, ARB PUF and TDC are evaluated in 20 copies of a custom ASIC fabricated in a 90 nm technology across 9 temperature-voltage (TV) corners, i.e., at all combinations of the temperatures −40° C., 25° C. and 85° C. and voltages 1.08 V, 1.2 V and 1.32 V. Statistical tests are applied to the bitstrings to evaluate their randomness, bias, uniqueness and stability. A thresholding technique is proposed that uses the TDC value to screen path comparisons where the delay difference is small. This technique is shown to allow the ARB PUF to achieve 100% reproducibility of the bitstring without error correction. This disclosure investigates the use of an on-chip TDC to obtain 'soft' information from the ARB PUF, and uses this information to improve its reliability across industrial temperature and voltage corners. In one example, the architecture of the proposed PUF consists of two basic components; an Arbiter (ARB) PUF, which implements the paths to be tested, and a Time-to-Digital Converter (TDC), which provides high resolution timing measurements of the path delays in the ARB PUF. The following presents the implementation details of these two components.

Figure 26:
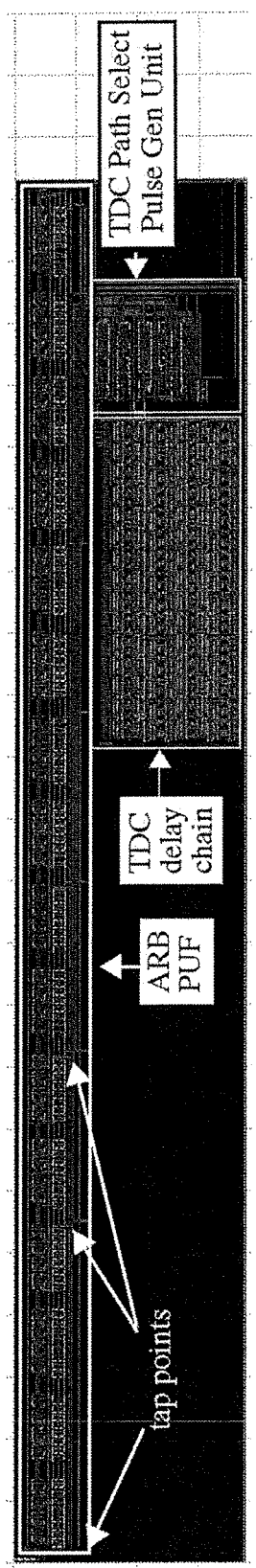
FIG. 26 is an annotated image illustrated an example layout a PUF that may implement one or more techniques of this disclosure.
Figure 27:
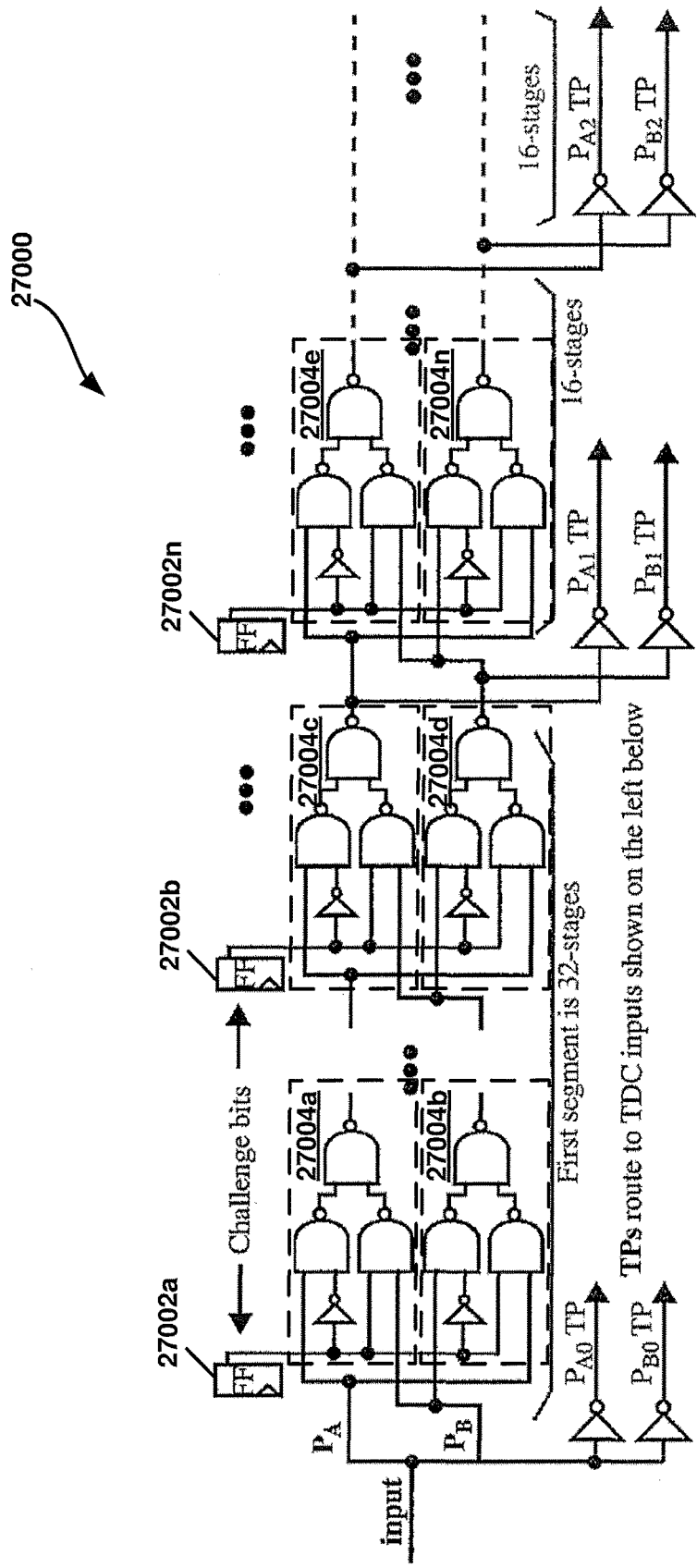
FIG. 27 is a schematic diagram of a circuit that may implement one or more techniques of this disclosure.

FIG. 26 is an annotated image illustrated an example layout a PUF that may implement one or more techniques of this disclosure. FIG. 26 shows the layout of an example ARB PUF and TDC in the 90 nm test chip architecture. The ARB is shown along the top as a sequence of 16 series-connected segments of 8 elements each. FIG. 27 illustrates a schematic level representation of the elements within the example ARB. The input to the ARB PUF 27000 is shown on the left side of FIG. 27 and connects to both of the $P_A$ and $P_B$ paths. Each of the 128 elements consist of a flip-flop (FF) 27002a-27002n and two copies of a 2-to-1 MUX 27004a-27004n. The FF is scan-connected with the others (not shown) and can be configured with a challenge bit. The challenge bit determines whether the two paths, $P_A$ and $P_B$, propagate signals straight through the 2-to-1 MUXes (when 0) or cross-over with $P_A$ propagating through the bottom MUX (e.g., 27004b) and $P_B$ through the top (when 1). A signal transition is introduced into the ARB PUF 27000 by asserting or de-asserting this input signal.

A unique feature of the ARB PUF 27000 is the introduction of a set of "tap points" (several are labeled in FIG. 26). The first tap point is connected directly to the input of the ARB ($P_{AO}$TP and $P_{BO}$TP in FIG. 27). The remaining tap points are implemented by fanning out at specific points along the paths $P_A$ and $P_B$ to a pair of buffers. For example, the second tap point connects to $P_A$ and $P_B$ at a point that is 32 elements from the input side of the ARB PUF 27000. The remaining 6 tap points connect at points further downstream after sequences of 16 additional elements. The outputs of the buffers at each tap point route to the inputs of the TDC as shown on the left side of FIG. 28A.

Figure 28A:
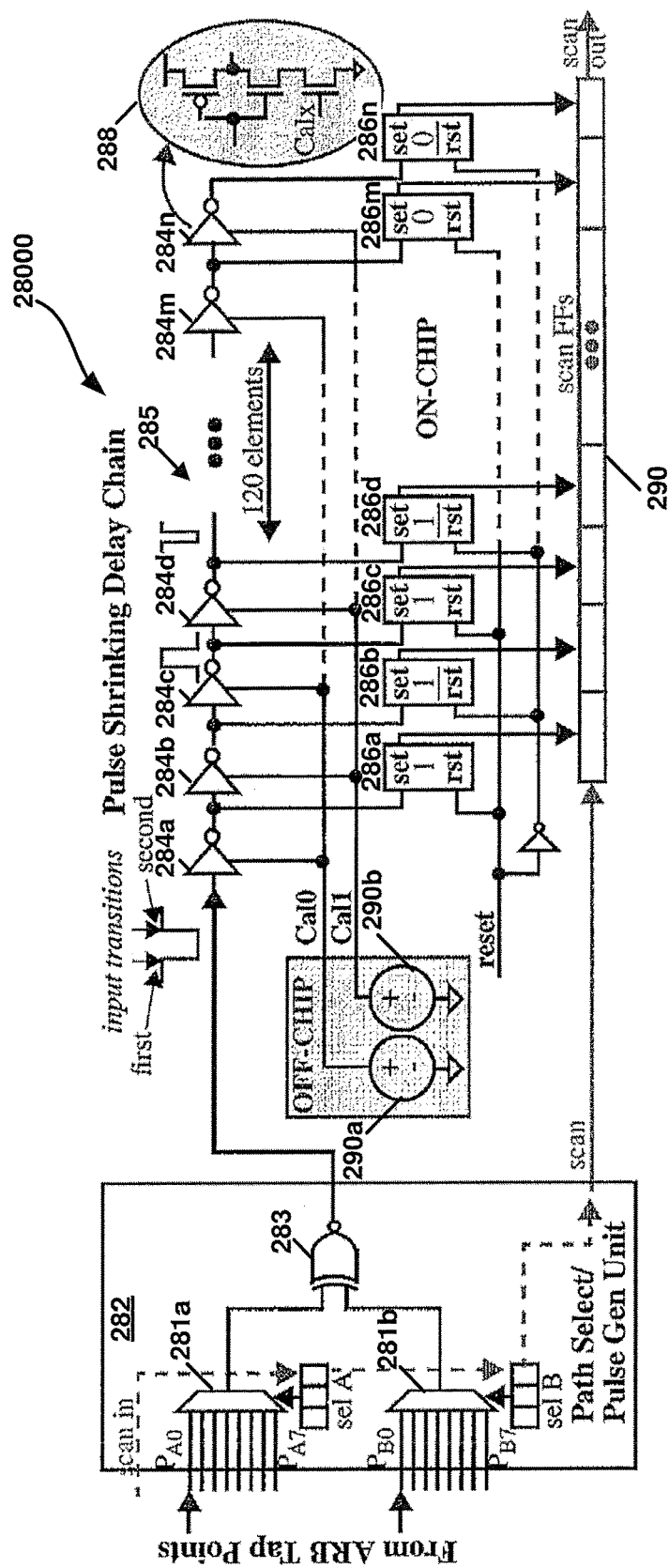
FIG. 28A is a schematic diagram of a TDC circuit that may implement one or more techniques of this disclosure.
Figure 28B:
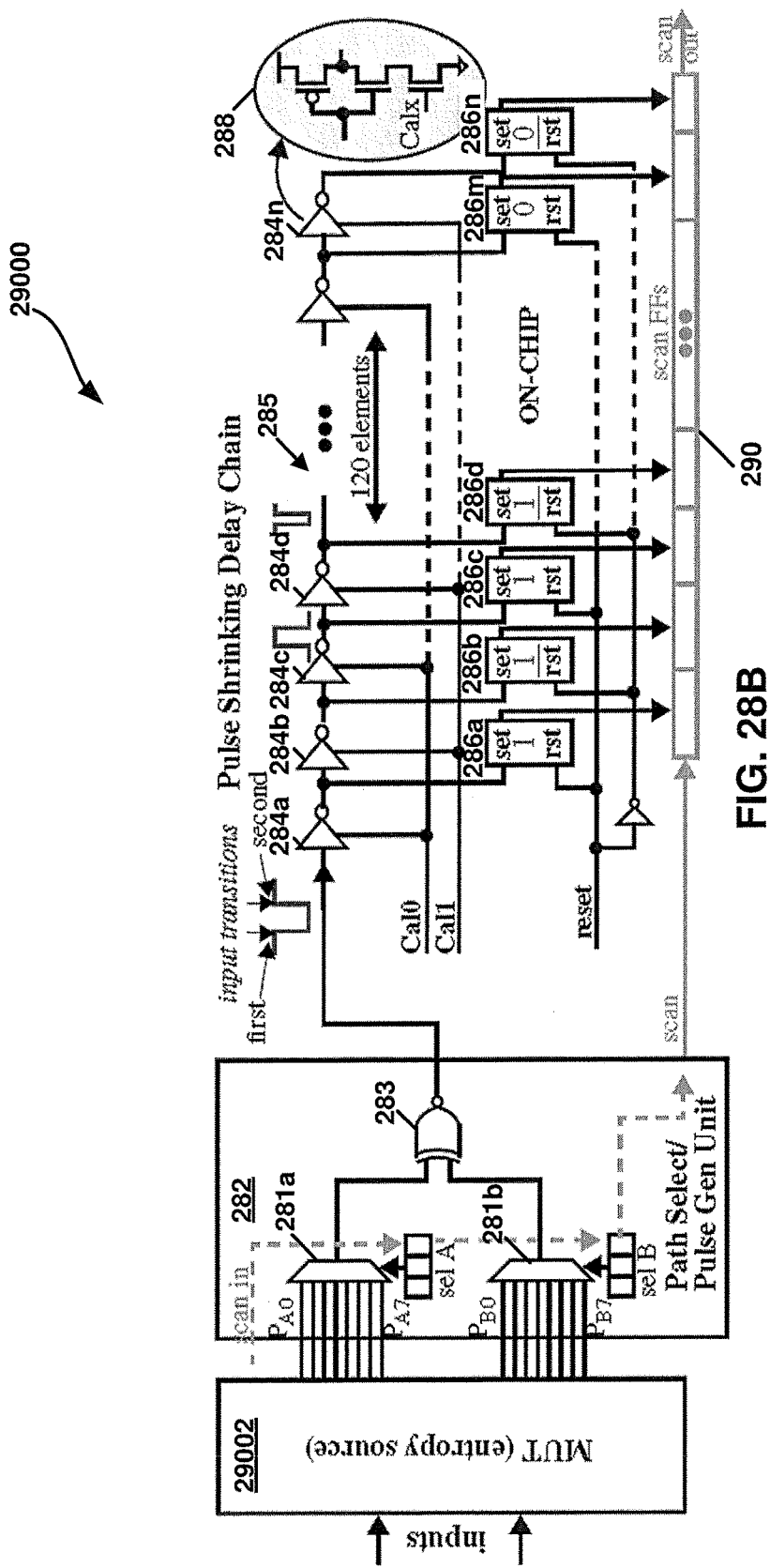
FIG. 28B is a schematic diagram of a TDC circuit that may implement one or more techniques of this disclosure.

FIG. 28A and FIG. 28B are schematic diagrams of TDC circuits that may implement one or more techniques of this disclosure. As illustrated FIG. 28A and FIG. 28B, TDC 28000 is shown as receiving ARB tap points as input and TDC 29000 is shown as receiving an input from a more general entropy source 29002. For the sake of brevity, the operation of TDC 28000 and TDC 29000 will be described collectively with respect to FIG. 28A.

TDC 28000 is designed to measure the relative delay between two input signals. The inputs to a TDC may include digital outputs from a macro-under-test (MUT) that serves as the source entropy. In the example illustrated in FIG. 28A the input to TDC 28000 includes a pair of tap points from the ARB PUF 27000. The relative delay is digitized by TDC 28000 using a current starved delay mechanism as described below. The digital code produced by TDC 28000 represents the magnitude of the difference between the delay of the two paths. TDC 28000 is implemented as two components, Path Select/Pulse Gen Unit 282 and Pulse Shrinking Delay Chain 285. Scan FFs in Path Select/Pulse Gen Unit 282, labeled 'Sel A' and 'Sel B,' drive the inputs of two 8-to-1 MUXes, 281a and 281b, which, in turn, select a specific pairing of tap point inputs, one from group 'A' and one from group 'B' (or another MUT). The outputs of 8-to-1 MUXes, 281a and 281b, route to the inputs of XNOR gate 283, which serves to generate a negative pulse for the Pulse Shrinking Delay Chain 285. The arrival of an edge on one of 8-to-1 MUXes propagates to XNOR gate 285 and generates the 1-to-0 transition of this negative pulse, and an edge (arriving later) on the other of 8-to-1 MUXes 281a-281b generates the 0-to-1 transition of the pulse. Specific configurations of tap point pairs that provide sufficient skew between the two edges from paths in the ARB PUF 27000 are described in detail below.

TDC 28000 is designed to 'pulse shrink' the negative output pulse from XNOR 285 as it propagates down a current-starved inverter chain. As the pulse moves down the inverter chain 284a-284n, it activates a corresponding set of set-reset latches 286a-286n to record the passage of the pulse, where activation is defined as storing a '1.' A thermometer code, i.e., a sequence of Ts followed by a sequence of '0's, represents the digitized difference in delays of two paths. Call-out of a current-starved inverter that may be used in the delay chain is shown as 288. The NFET transistor with input labeled 'Calx' implements the current-starving mechanism. The Calx inputs are driven by two analog control voltages, labeled 'Cal0' and 'Cal1. The current-starved inputs of all the even numbered inverters are connected to Cal0 while the inputs of the odd numbered inverters are connected to Cal1. This type of configuration allows independent control over the propagation speed of the two transitions associated with the negative pulse. For example, increasing the voltage on Cal1 toward the supply voltage allows the odd numbered inverters to switch more quickly when the first transition, i.e., the 1-to-0 input transition, propagates to their inputs. It should be noted that the 1-to-0 input transition creates 0-to-1 transitions on the inputs of the odd numbered inverters in the chain, which activates the pull-down paths of these inverters. With Cal0 fixed at a specific voltage, larger assigned Cal1 voltages allows the pulse to 'survive' longer in the delay chain because the first edge propagates more quickly. The speed of trailing 0-to-1 input transition does not change with Cal0 fixed, and therefore it takes longer for this edge to catch-up to the leading transition. Eventually it does (assuming Cal0 and Cal1 are set such that the trailing edge is faster) and the pulse disappears. All latches up to the point where the pulse disappears store a '1', while those beyond this point store '0'. The state of the latches can then be transferred to the scan FFs 290 for scan-out and analysis.

The pulse-shrinking behavior of TDC 28000 allows very high timing resolution, i.e., 10's picoseconds, in measurements of the width of the input pulse assuming the Cal0 and Cal1 voltages are fixed and stable. As illustrated in FIG. 28A, in some examples, Cal0 and Cal1 may be supplied using off-chip voltage supplies 290a and 290b. The timing resolution of TDC 27000 is related to how far the pulse propagates along the delay chain 285, where pulse propagations to points near the end of delay chain 285 provide the highest resolutions. It is possible, however, for the pulse to propagate off the end of TDC 27000, a condition referred to as overflow, which obviously must be avoided. By choosing the proper Calx voltages, the overflow condition can be prevented while simultaneously allowing for high timing resolutions. In one example, the Calx inputs may be driven using an on-chip resistor ladder network (not shown), and a controller may be used to select the proper Calx voltages from this resistor ladder network. The primary function of the controller is to carry out a calibration process that is designed to prevent overflow.

In experiments described below, both of the Calx voltages were controlled using off-chip power supplies. This allowed the parameters of the ARB PUF architecture to be explored. As described above, the off-chip power supplies may be replaced with an on-chip resistor ladder network, and a controller will be used to select the proper Calx voltages from this resistor ladder network. As discussed in detail below, the primary function of the controller will be to carry out a calibration process that is designed to prevent overflow. From experiments that were conducted, maximizing the timing resolution is of benefit, but is not a requirement for the TDC to be effective in improving reliability of the ARB PUF.

In preliminary experiments, it was discovered that it is not necessary to have independent control over the leading and trailing edges of the pulse. The data presented in the experiments was obtained by fixing Cal0 to the supply voltage. Therefore, only Cal1 is tuned in the experiments. The Cal1 voltage required to meet the above constraints varied as a function of the ambient temperature and voltage conditions, but was largely self-compensating. More details on this issue are provide after it is described how the ARB PUF 27000 and TDC 28000 are used together to collect delay measurements below. In one example, the overhead of the ARB and TDC combination is as follows. ARB PUF 27000 with 128 elements occupies an area of approximately 525 um×25 um (13 k um$^2$) while the TDC 28000 occupies an area of 176 um×60 um (10 k um$^2$). As we shown below, the size of ARB PUF 27000 is sufficient to generate several hundred delays, each of which has at least one constituent element in a given ARB delay path that is completely independent of the others. Simple modifications can be made to increase the number of independent delays to a 1000 or more with only a moderate increase in area.

Figure 29:
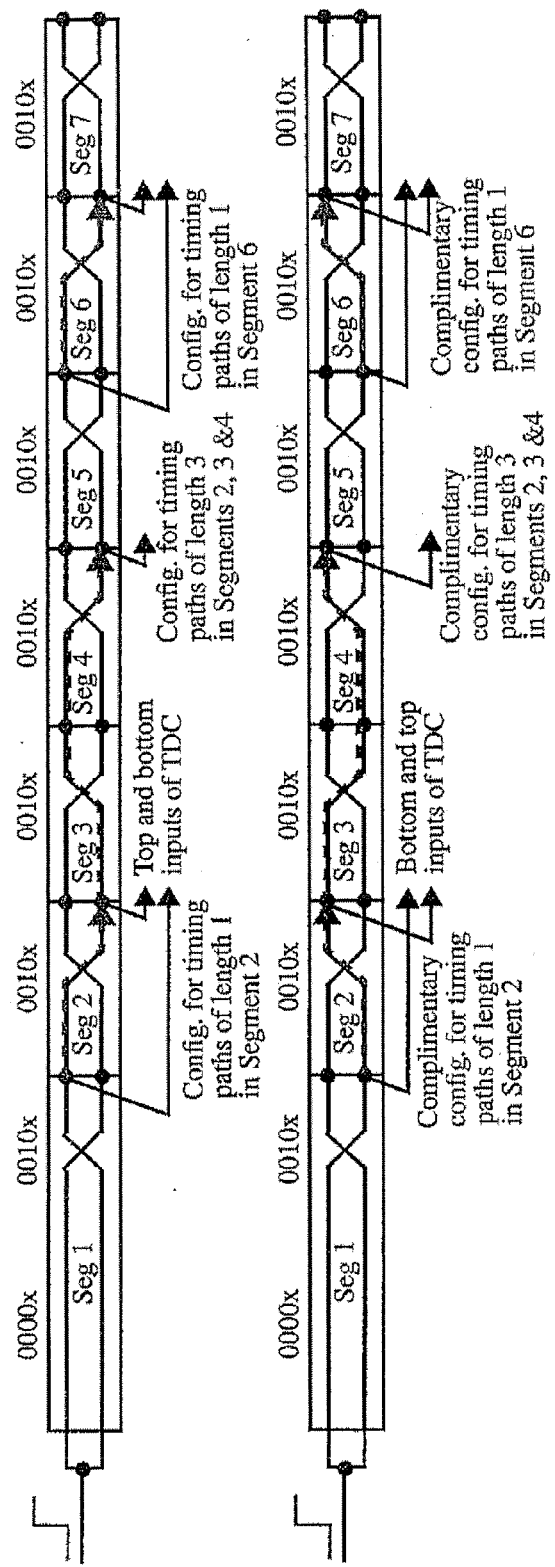
FIG. 29 is an example timing diagram illustrating one or more techniques of this disclosure.

As described above, the addition of the tap points provides a unique opportunity to measure delays along segments of the ARB PUF 27000. It should be noted that, traditional approaches do not allow entropy to be extracted from the constituent elements of the ARB's delay chains FIG. 29 illustrates how tap points can be used to measure delays along path segments. The elongated rectangles in FIG. 29 represent an abstraction of ARB PUF 27000 in which the 128 elements are partitioned into seven segments labeled Seg 1 to Seg 7. The first segment contains 32 elements while the remaining segments includes 16 elements. The top portion shows two configurations for measuring paths of length 1 (in segments 2 and 7) and one configuration for measuring paths of length 3 (across segments 2, 3 and 4). It should be noted that a path of length 1 is defined as a 16-element segment within ARB PUF 27000. In the examples shown in FIG. 29, the number of switches configured with a '1' is odd, which ensures that TDC 28000 times a single path. For example, the signal propagating along the top path to the tap point at the beginning of segment 2 crosses-over to the bottom path before reaching the second tap point at the beginning of segment 3. The path that is timed is highlighted in FIG. 29. The term x-over is used to refer to switches that are configured to cause the path to cross-over from top to bottom or bottom to top.

Figure 30:
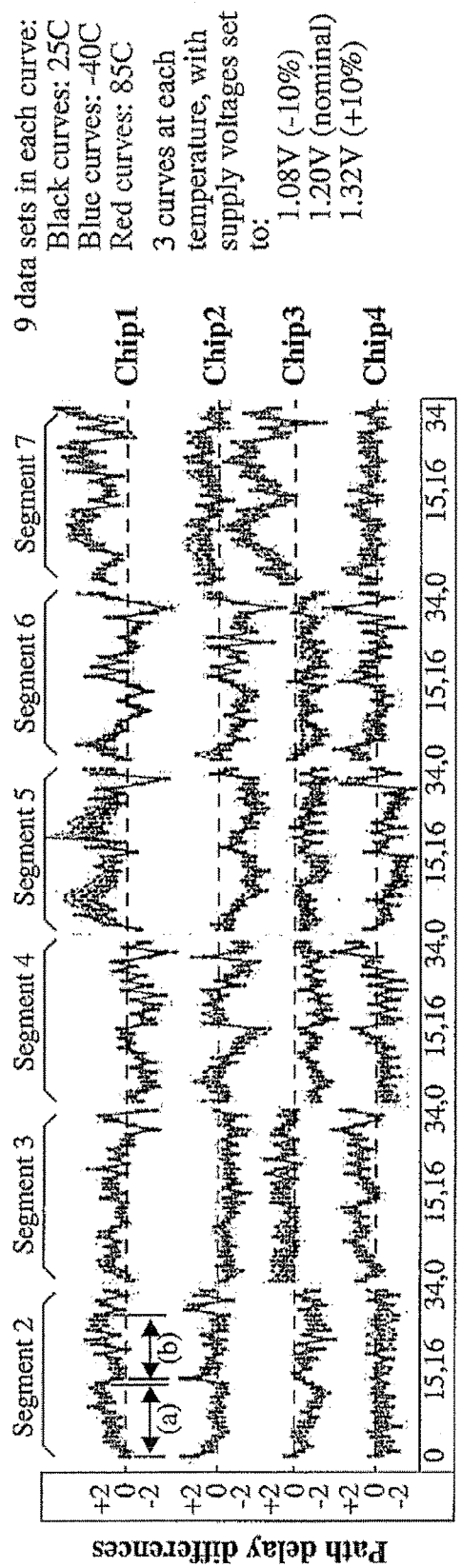
FIG. 30 is an example timing diagram illustrating one or more techniques of this disclosure.

In order to eliminate any bias that exists in the TDC measurement structure, in particular along the paths from the tap points through the 8-to-1-MUXes 281a-281b in TDC 28000 and to XNOR gate 283, complementary paths of those shown in the top portion of FIG. 29 are also tested and the two measurements are subtracted. The bottom portion of FIG. 29 shows the complementary configuration of the three tap point combinations given in the top portion. The waveforms shown in FIG. 30 depict TDC measurement results for paths of length one (enumerated along the x-axis) for four chips. The waveforms are offset along the y-axis to facilitate comparisons between the waveforms. The path delays plotted along the y-axis are given in units of TDC bits. As described above, the values plotted are actually the difference in the number of TDC '1' bits measured from two complementary paths. The plotted differences are computed using the average number TDC bits from a set of 11 measurements carried out on each path and its complement. There are a total of 211 data points for each chip, which represent all the paths of length 1 that were tested using 40 different challenges. The curves for each of the nine temperature-voltage (TV) corners are superimposed to illustrate the 'noise' introduced by environmental variations. From the graphs illustrated in FIG. 30, it is clear that TV variations are smaller in many cases than the delay variations introduced by process variations.

The first 16 data points in each 16-element segment of the waveform show the results from a set of canonical challenges. The canonical challenges introduce exactly 1 x-over, similar to those shown in FIG. 29 for paths of length 1. These points are labeled in FIG. 30 as (a) for Chip1. The data points are ordered so that the position of the x-over element in each test is adjacent to x-over elements that were tested under previous (and subsequent) challenges. This arrangement allows the magnitude of delay variations introduced by swapping a single pair of elements to be observed incrementally along each of the waveform segments. The data points labeled (b) are arranged similarly except the consecutive tests introduce 3 x-overs. Although delay variations within these groups are relatively small, variations across groups and especially across segments are much larger. Below it is shown that good statistical results can be obtained from these TDC measured delays. As indicated above in reference to FIG. 29, other tap point configurations allow the measurement of delays from paths that traverse multiple segments. However, the statistical averaging effect of delays along longer path segments makes it difficult to measure distinguishing characteristics in them at sufficient resolution, and therefore, their usefulness for PUF bit generation is limited. Therefore, only paths of length 1 are used to generate the bitstrings analyzed below.

Figure 31:
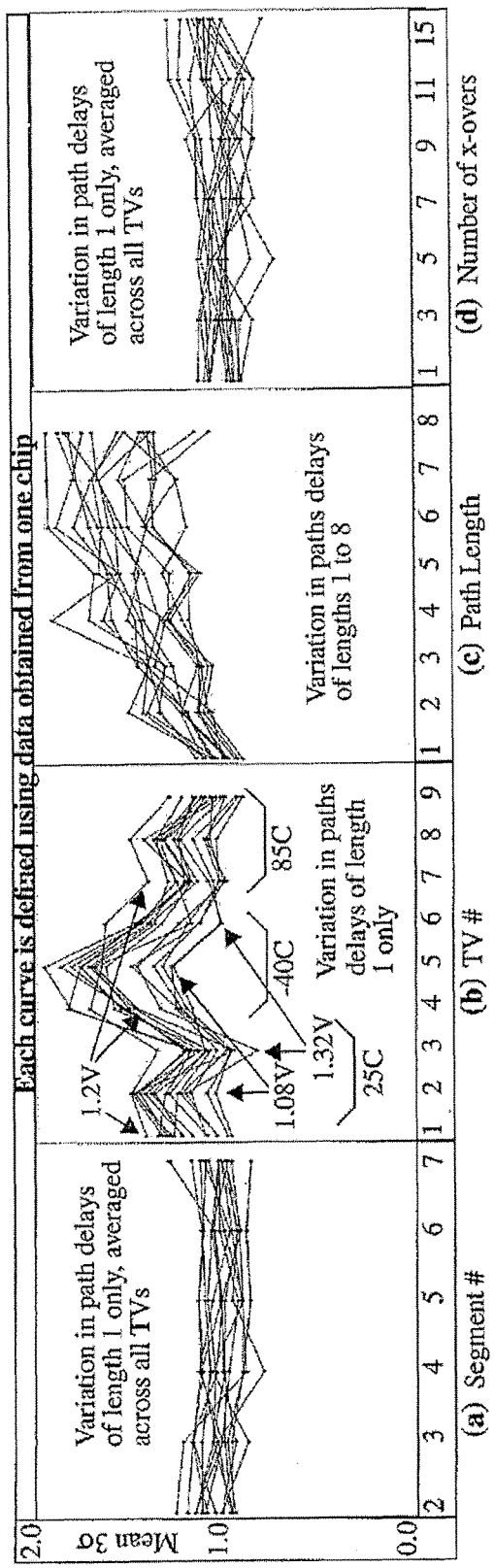
FIG. 31 is an example graph illustrating one or more techniques of this disclosure.

Measurement noise and noise introduced by varying temperature and voltage conditions work to reduce the reliability of the ARB PUF 27000. Reliability is defined here as the ability of a PUF to exactly reproduce the same bitstring during 'regeneration' experiments. The bitstrings produced at 25° C. and at 1.20 V (nominal supply voltage) are referred to as the reference (or enrollment) bitstrings, while bitstrings produced at the remaining 8 temperature-voltage corners are referred to as regeneration bitstrings. As described above, enrollment defines the bitstring generation process that is carried out initially. As described above, the chips used in this set of experiments are tested at all combinations of temperatures −40° C., 25° C. and 85° C. and voltages 1.08 V, 1.2 V and 1.32 V, the noise level are evaluated independently. The plots in FIG. 31 depict noise levels as 'average 3 σ values' on the y-axis. It should be noted that three σ is a statistical measure that bounds 99.73% of the population. Each of the plots labeled in portion (a) through portion (b) of FIG. 31 depict sixteen different waveforms, one for each of the sixteen chips considered in this analysis. The waveforms in portion (a) give the average 3 σ's of all measurements within each of the six ARB PUF segments (in reference to FIG. 29 for paths of length 1). As described above, eleven TDC samples were collected for each tested path. The average 3 σ's in the plot represent the measurement noise in these repeated samples. From FIG. 31, the average 'hovers' around 1 for all chips and is independent of the segment number given along the x-axis. Therefore, the timing uncertainty remains constant across the six segments. In contrast, noise introduced by temperature-voltage variations, as shown in portion (b) of FIG. 31, is not constant. Again, only paths of length 1 are included in the analysis. The y-axis in this case plots the average 3 σ's of all path measurements at each of the nine TV corners, as indicated by the labels in FIG. 31. In general, noise levels are larger at −40° C. (center portion of plot) than at 25° C. and 85° C. Also, noise increases as supply voltage is lowered, as shown by the y-magnitudes of the points within each temperature group. Portion (c) of FIG. 31 also shows that noise increases as the length of the path increases, which is expected given that longer signal paths have larger amounts of jitter and are exposed over longer periods to power supply noise variations. Similar to portion (a) of FIG. 31, noise levels as a function of the number of x-overs appears to remain relatively constant as shown in portion (d) of FIG. 31.

Figure 32:
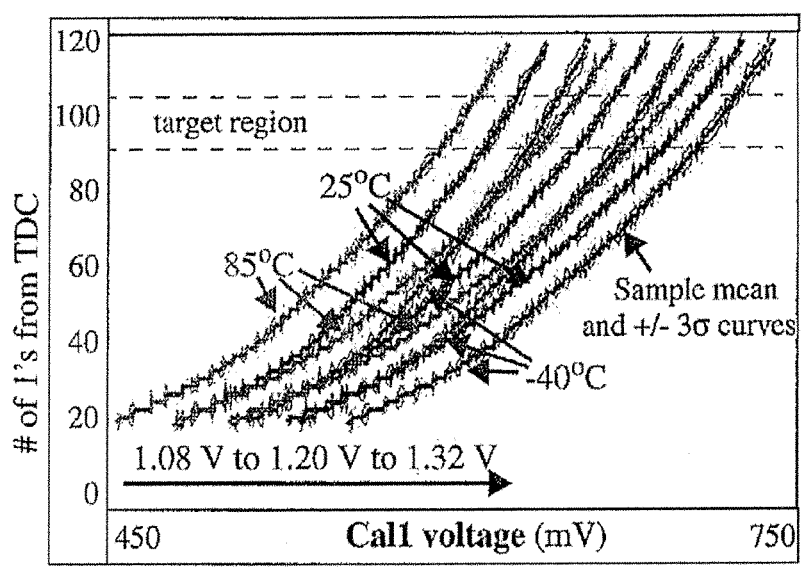
FIG. 32 is an example graph illustrating one or more techniques of this disclosure.

As described above, in some examples, Cal1 needs to be 'tuned' to compensate for changes in the TDC behavior introduced by TV variations. The curves in FIG. 32 illustrate the behavior of the TDC in one of the chips at the nine TV corners investigated in the experiments. The x-axis sweeps the Cal1 voltage over a range of 450 to 750 mV. The y-axis plots the number of 1's read from the TDC under each of these Cal1 settings. In FIG. 32, the individual curves are labeled to indicate the TV corner under which the data was collected. The mean values as well as the 3 σ upper and lower limits are superimposed on the graph. Although the shapes of the curves change to some degree, the main effect of TV variations is reflected as the shift in the curves along the x-axis. In order to ensure that a TDC is able to produce values in the region labeled 'target region' at each of these TV corners, in some cases, it may be necessary to 'tune' the Cal1 voltage. It should be noted that shifts due to voltage variations will be automatically calibrated for by an on-chip resistor ladder network. This is true because the resistor ladder network will be connected to the power grid on the chip and will track changes in the power supply voltage automatically. Therefore, the primary issue is dealing with shifts introduced by temperature variations.

A calibration procedure to tune Cal1 so that overflow does not occur and the TDC produces values in the target region under temperature variations may be used. The objective of a calibration process is to select a voltage produced by the on-chip resistor ladder network and apply this voltage to the Cal1 signal of the TDC. This can be accomplished by choosing a tap point combination and iteratively testing that path and adjusting the voltage until the number of 1's produced is in the target region. The process can be implemented by an on-chip state machine and using a binary search process (to make it fast). In the conducted experiments, the binary search process was emulated in LABVIEW software and an external power supply to emulate the on-chip resistor ladder network was used.

In the conducted experiments, bitstrings are generated by comparing the 211 TDC data points obtained from each chip in all combinations, which yields bitstrings of length 21,155 bits. As described below, a thresholding technique may be used to discard those comparisons which are vulnerable to producing 'bit flips' under TV variations. In one example, the 'soft' information provided by a TDC can be used to avoid those path delay pairings whose difference is likely to result in a bit flip during regeneration. A thresholding technique is described that accomplishes this goal. During enrollment, comparisons of delay differences which are smaller than the threshold are discarded. The comparisons that are discarded are recorded in public data so that they are avoided during the regeneration process. Based on preliminary analysis, it was found that a threshold of approximately 5, in units of the number of produced by the TDC, eliminates all bit flips that occur in the bitstring generation of the chips.

Figure 33:
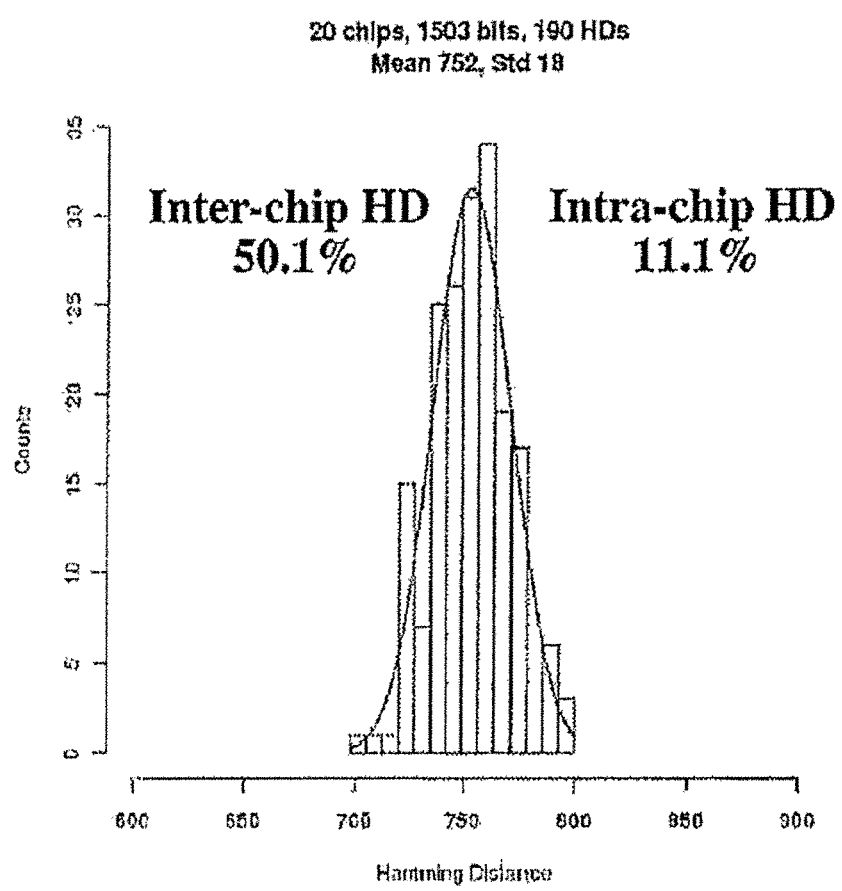
FIG. 33 is an example graph illustrating one or more techniques of this disclosure.

Below the several important statistical properties of the bitstrings including randomness, uniqueness and probability of bit flips, e.g., failures to regenerate the bitstring under different environmental conditions are described. In one example, the size of the bitstring after thresholding was 1,955 bits on average. The inter-chip HD requires that the bitstrings for all chips are the same size. In the experiments, this requirement is accommodated by finding the chip with the shortest bitstring and reducing the size of the other bitstrings to this length. The smallest bitstring was 1,503 bits. The RN from the bitstrings of the 20 chips are computed under all combinations. FIG. 33 gives the inter-chip hamming distance (HD) distribution along with superimposed Guassian curve bit to illustrate the level of conformance of the distribution to a normal distribution. The average inter-chip HD was given as 50.1%, which is very close to the ideal of 50.0%. With thresholding, all bit flips are avoided and therefore the intra-chip HD was 0%. The true intra-chip HD was given as 11.1% to illustrate the fraction of the population that is unstable. Only nine of the NIST tests are applicable to bitstrings of size 1,503. The bitstrings passed all of the tests except several Non-overlapping Template tests and the Approximate Entropy Test. However, the tests that failed only failed by 2 chips beyond the required 18 for a population of this size.

Various examples have been described. These and other examples are within the scope of the following claims.

What is claimed is:

1. A method for generating a bitstring for a physically unclonable function, the method comprising:
    measuring path delays corresponding to a set of launch-capture tests;
    for each of the measured path delays, determining whether a respective path is a stable path, wherein the stable path is defined as a path which has a rising transition or a falling transition, is glitch-free, and produces consistent results across multiple launch-capture tests;
    selecting one or more pairs of the stable paths of the measured path delays; and
    generating a bitstring one bit at a time, wherein each bit is generated from each of the one or more pairs of the stable paths.

2. The method of claim 1, wherein the pairs of the measured path delays are selected pseudorandomly.

3. The method of claim 1, wherein a first measured path delay in a pair is less than a first threshold value and a second measured path delay in the pair is greater than a second threshold value.

4. The method of claim 1, wherein generating a bitstring includes using a difference value of measured path delays to generate a bit, if it is determined that the difference value is greater than a threshold value.

5. The method of claim 1, wherein generating a bitstring includes using a difference value of measured path delays to generate a bit, if it is determined that the difference value is greater than a lower threshold value and less than an upper threshold value.

6. The method of claim 1, wherein generating a bitstring includes applying a modulus operation to digital representation of two or more of the measured path delays; and
   partitioning the results of the modulus operation into two or more groups.

7. The method of claim 6, wherein modulus operation is configured to remove bias.

8. The method of claim 1, further comprising generating two or more redundant bitstrings and determining a final bitstring based on a majority rule.

9. A device for generating a bitstring for a physically unclonable function, the device comprising:
   circuitry configured to measure path delays corresponding to a set of launch-capture tests;
   circuitry configured to determine whether a path is stable, wherein a stable path is defined as a path which has a rising transition or a falling transition, is glitch-free, and produces consistent results across multiple launch-capture tests;
   circuitry configured to select one or more pairs of stable paths; and
   circuitry configured to generate a bitstring one bit at a time, wherein each bit is generated from each of the one or more pairs of the stable paths.

10. The device of claim 9, wherein the pairs of the measured path delays are selected pseudorandomly.

11. The device of claim 9, wherein a first measured path delay in a pair is less than a first threshold value and a second measured path delay in the pair is greater than a second threshold value.

12. The device of claim 9, wherein generating a bitstring includes using a difference value of measured path delays to generate a bit, if it is determined that the difference value is greater than a threshold value.

13. The device of claim 9, wherein generating a bitstring includes using a difference value of measured path delays to generate a bit, if it is determined that the difference value is greater than a lower threshold value and less than an upper threshold value.

14. The device of claim 9, wherein generating a bitstring includes applying a modulus operation to digital representation of two or more of the measured path delays; and
   partitioning the results of the modulus operation into two or more groups.

15. The device of claim 14, wherein modulus operation is configured to remove bias.

16. The device of claim 9, further comprising circuitry configured to generate two or more redundant bitstrings and determining a final bitstring based on a majority rule.

17. The method of claim 1 further comprising:
   applying a linear transformation to the measured path delays correcting changes in temperature and voltage environmental conditions.

18. The method of claim 17, wherein the linear transformation shifts and scales the measured path delays to match a reference distribution.

19. The device of claim 9 further comprising a linear transformation, wherein the linear transformation corrects changes in temperature and voltage environmental conditions of the measured path delays.

20. The device of claim 19, wherein the linear transformation shifts and scales the measured path delays to match a reference distribution.

* * * * *